(12) United States Patent
Okubo

(10) Patent No.: US 7,397,824 B2
(45) Date of Patent: Jul. 8, 2008

(54) INTER-NODE SYNCHRONIZATION METHOD IN RADIO NETWORK SYSTEM, RADIO CONTROL SERVER, AND RADIO BEARER SERVER

(75) Inventor: Akira Okubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 420 days.

(21) Appl. No.: 10/557,464

(22) PCT Filed: Apr. 23, 2004

(86) PCT No.: PCT/JP2004/005927

§ 371 (c)(1),
(2), (4) Date: Nov. 18, 2005

(87) PCT Pub. No.: WO2004/105418

PCT Pub. Date: Dec. 2, 2004

(65) Prior Publication Data

US 2006/0251045 A1 Nov. 9, 2006

(30) Foreign Application Priority Data

May 20, 2003 (JP) ............................. 2003-142627

(51) Int. Cl.
*H04J 3/06* (2006.01)
(52) U.S. Cl. ...................... 370/503; 370/338; 370/350; 370/522
(58) Field of Classification Search ................. 370/503, 370/338, 522, 350; 455/436, 442, 422.1, 455/3.01
See application file for complete search history.

(56) References Cited

U.S. PATENT DOCUMENTS

| 5,761,619 | A | * | 6/1998 | Danne et al. | ............. 455/422.1 |
| 2002/0103010 | A1 | * | 8/2002 | Thomas et al. | ............. 455/560 |
| 2003/0117997 | A1 | * | 6/2003 | Kim | ............. 370/350 |

FOREIGN PATENT DOCUMENTS

| CN | 1414741 A | 4/2003 |
| JP | 2002-224261 | 8/2000 |
| JP | 2002-026919 | 1/2002 |
| JP | 2002-538688 | 11/2002 |
| JP | 2003-087175 | 3/2003 |
| JP | 2003-102053 | 4/2003 |
| WO | WO 00/28744 | 5/2000 |
| WO | 2005/006800 | 1/2005 |

OTHER PUBLICATIONS

U.S. Appl. No. 10/479,215, filed Dec. 1, 2003, Okubo.
U.S. Appl. No. 10/557,464, filed Nov. 18, 2005, Okubo.
Technical Report in Mobile Wireless Internet Forum, MTR-007 Open RAN Architecture in 3 rd Generation Mobile Systems Release v1.0.0, pp. 3-64, Sep. 4, 2001.

* cited by examiner

*Primary Examiner*—George Eng
*Assistant Examiner*—Huy Phan
(74) *Attorney, Agent, or Firm*—Oblon, Spivak, McClelland, Maier & Neustadt, P.C.

(57) ABSTRACT

When a control message for indicating transfer of a new call is exchanged between a serving radio control server and a serving radio bearer server, time information held by the serving radio control server and time information held by the serving radio bearer server are set in the control message, and a node synchronization processing for node synchronization between the serving radio control server and the serving radio bearer server is executed based on a difference.

18 Claims, 15 Drawing Sheets

INTER-NODE SYNCHRONIZATION METHOD IN RADIO NETWORK SYSTEM, RADIO CONTROL SERVER, AND RADIO BEARER SERVER

TECHNICAL FIELD

The present invention relates to a node synchronization method for a radio network system that includes radio base stations that communicate with a mobile terminal, a plurality of radio control servers that manage the radio base stations and control a radio line of a control plane, and a plurality of radio bearer servers that control a data transfer between a user plane and the mobile terminal, and relates to a radio control server and a radio bearer server.

BACKGROUND ART

Recently, along with increasing demands for mobile communications, IMT-2000 (International Mobile Telecommunication) regarded as a third generation mobile communication system, in particular, is realizing unprecedented high-speed and wide transmission. It is expected that a mobile environment using features of this communication system will be particularly valued for multimedia communications such as moving image communications.

Development of a distributed radio network system having flexibility and extendability is currently considered. For example, Nonpatent Literature 1 has been laid down as a technical report in Mobile Wireless Internet Forum.

FIG. 15 is a block diagram of a functional model of a radio network system disclosed in the Nonpatent Literature 1. In this radio network system, a radio base station 30 is referred to as "Node B" in a third generation mobile communication system. Notification of system information, survey of radio environments, coding and decoding of a radio channel, detection of random access, measurement of unlink outer loop power, downlink outer loop power control, and uplink inner loop power control are performed on a radio layer 1 denoted by reference numeral 31 in FIG. 15.

An RNC (Radio Network Controller) 32 is divided to a Control/Drift RNC 33 and a Serving RNC 34. The Control/Drift RNC 33 includes functions configured by a cell bearer gateway 35, a cell controller 36, a common radio resource management 37, a paging/broadcast 38, and a UE GEO location 39. The Serving RNC 34 includes functions configured by a UE GEO location 39, a user radio gateway 40, and a mobile control 41.

The cell bearer gateway 35 performs common channel multiplexing and demultiplexing and data transmission on a broadcast and multicast radio bearer. The cell controller 36 performs control over assignment and congestion with respect to radio resources, assignment of discrete physical radio resources, assignment of common logic radio resources, management of assignment and configuration of dynamic common physical resources, control over notification of system information, measurement and collection of cell environments, assignment of a dynamic channel, cell paging, and downlink open loop power control. The common radio resource management 37 measures and collects radio network environments and optimizes a network load. The paging and broadcast 38 performs control over a broadcast flow or a multicast flow of the radio bearer, notification of a broadcast or multicast state of the radio bearer, adjustment of a call to a mobile terminal in multi cells, and adjustment of a call to the mobile terminal. The UE GEO location 39 collects and calculates information on a position of the mobile terminal.

The user radio gateway 40 performs segmentation and assembling, confirmation of discrete channel transmission, header compression, discrete channel multiplexing and demultiplexing, macro diversity combining and splitting, processing for the uplink outer loop power control, measurement of radio media access, and radio channel encryption. The mobile control 41 performs assignment of discrete logic radio resources, management of configurations of discrete physical radio resources, control over flows of discrete radio packets, adjustment of assignment control, management of contexts of the radio resources, trace, connection setting and unsetting, mobile terminal measurement control, uplink outer loop power control, adjustment of the downlink outer loop power control, mapping of the radio discrete packet flow to a radio QoS, mapping of the radio bearer to a transport QoS, location management, control over macro diversity combining and splitting, radio channel coding control, media access measurement control, TDD timing control, measurement and calculation of radio frame transmission, discrete calling to the mobile terminals, and handover control.

The functional models of the radio network system have the features in that a transport layer is completely separated from a radio network layer so as to ensure flexibility and extendability. In addition, as indicated by a one-dot chain line in FIG. 15, the radio network layer is separated into a signaling plane that serves as a control plane including the cell controller 36, the common radio resource management 37, the paging and broadcast 38, the UE GEO location 39, and the mobile control 41, and a bearer plane that serves as a user plane including the cell bearer gateway 35 and the user radio gateway 40.

Nonpatent Literature 1: Technical Report in Mobile Wireless Internet Forum, MTR-007 Open RAN Architecture in 3rd Generation Mobile Systems Release v1.0.0 (12 Jun. 2001)

According to the conventional system disclosed in the Nonpatent Literature 1, in order to provide the system with the flexibility and extendability, the respective functional blocks are defined while the radio network layer is separated into the signaling plane serving as the control plane and the bearer plane serving as the user plane. However, the Nonpatent Literature 1 does not disclose the way of synchronizing a plurality of devices (nodes) when one functional block is realized by the devices (nodes).

The present invention has been achieved in view of these circumstances. It is an object of the present invention to provide a node synchronization method for a radio network system that can reduce traffic of control messages related to node synchronization between one of a plurality of radio bearer servers that control a data transfer between a mobile terminal and a user plane (bearer plane) and one of a plurality of radio control servers that control reception of a call, and that can efficiently establish the node synchronization between the radio bearer server and the radio control server, and to provide a radio control server and a radio bearer server.

DISCLOSURE OF INVENTION

According to one aspect of the present invention, a node synchronization method employed on a radio network system that includes a plurality of radio base stations that communicate with a plurality of mobile terminals; a plurality of radio control servers that manage the radio base stations and control a radio line in a control plane; and a plurality of radio bearer servers that control a data transfer between each of the mobile terminals and the user plane, wherein if a control message for indicating transfer of a new call is exchanged between each of the radio control servers and each of the radio bearer servers when the new call is generated, time information held by the each radio control server and time information held by the each radio bearer server are set in the control message, and a node synchronization processing for node synchronization between the each radio control server and the each radio bearer server is executed based on a difference between the time information elements.

According to the present invention, when control messages that indicate transfer of a new call are exchanged between the radio control server and the radio bearer server when the new call is made, time information held by the radio control server and that held by the radio bearer server are set in the control messages, and the node synchronization processing for node synchronization between the radio control server and the radio bearer server is executed based on the difference between the time information elements. It is, therefore, possible to efficiently perform the node synchronization processing and reduce traffic of the control messages related to the node synchronization.

BEST MODE(S) FOR CARRYING OUT THE INVENTION

The present invention will be explained in detail below with reference to the accompanying drawings.

First Embodiment

According to a first embodiment, a plurality of serving radio bearer servers-regularly notify a serving radio control server of resource (channel) utilization states. The serving radio control server determines utilization states of the discrete serving radio bearer servers based on the notified resource (channel) utilization states. The serving radio control server assigns a new call to the serving radio bearer server having most vacant resources (channels). In addition, when transmitting and receiving control messages for indicating transfer of the new call between the serving radio control server and the serving radio bearer server, the serving radio control server adds (superimposes) time information held by each server (serving radio control server or serving radio bearer server) to (on) the control messages. Based on the time information, a node synchronization processing for synchronizing the both servers is executed.

Figure 1:
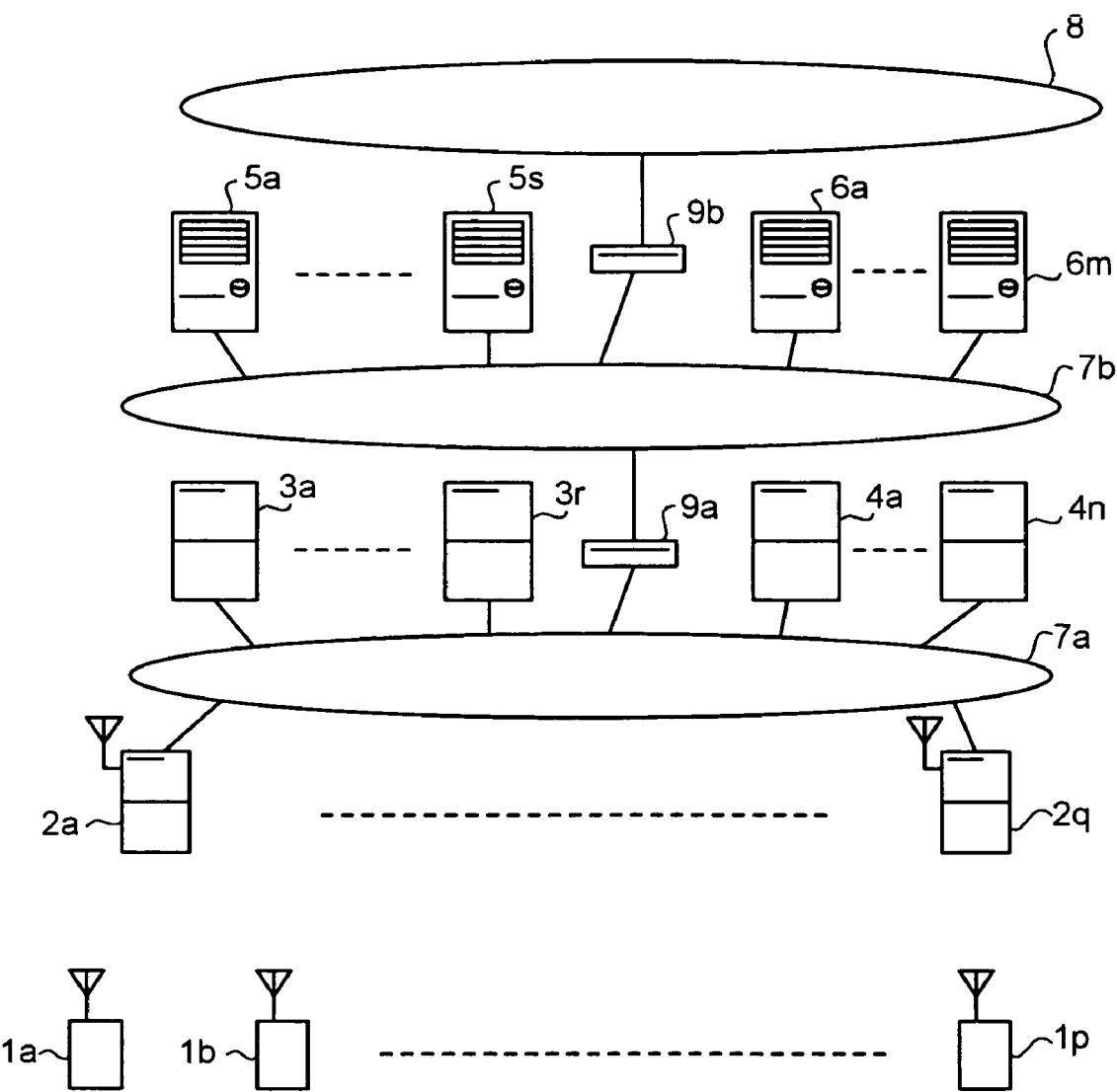
FIG. 1 depicts a configuration of a radio network system to which the present invention is applied.

FIG. 1 depicts an example of a configuration of the radio network system according to the present invention. The radio network system includes mobile terminals $1a$ to $1p$, radio base stations $2a$ to $2q$, cell control radio bearer servers $3a$ to $3r$, serving radio bearer servers $4a$ to $4n$, cell control radio control servers $5a$ to $5s$, serving radio control servers $6a$ to $6m$, IP backbone networks $7a$ and $7b$, a core network 8 of a mobile communication network, and router devices $9a$ and $9b$.

The radio base stations $2a$ to $2p$ communicate with the mobile terminals $1a$ to $1q$. The cell control radio bearer servers $3a$ to $3r$ exercise data transfer control over a user plane (bearer plane) for every common channel. The serving radio bearer servers $4a$ to $4n$ exercise data transfer control over the user plane for every discrete channel. The cell control radio control servers $5a$ to $5s$ control a radio line of a control plane corresponding to the common channel. The serving radio control servers $6a$ to $6m$ control radio lines of a control plane corresponding to the discrete channels.

A plurality of radio bearer servers configured by the cell control radio bearer servers $3a$ to $3r$ and the serving radio bearer servers $4a$ to $4n$ are mainly responsible for data transfer control (such as user data multiplexing and demultiplexing, encryption, and user data transfer control such as macro diversity) over a user plane (bearer plane) with respect to the mobile terminals $1a$ to $1n$. A plurality of radio control servers configured by the cell control radio control servers $5a$ to $5s$ and the serving radio control servers $6a$ to $6m$ are mainly responsible for management of the radio base stations $2a$ to $2n$ and for control over radio lines of the control plane (such as RBS control and control over radio resources such as frequency, spreading codes, and transmission power). The common channel is used for transferring data that is not related to a specific one mobile terminal, and the common channel is shared among the mobile terminals. The discrete channel is used for transferring data related to a specific one mobile terminal. The control plane, which is also referred to as "signaling plane", is a plane (an assembly of interfaces, functional blocks, etc.) for transmitting various control information for transferring user data. The user plane, which is also referred to as "bearer plane", is a plane for transmitting user data such as voice and packets.

The IP backbone network $7a$ contains the radio base stations $2a$ to $2p$, the cell control radio bearer servers $3a$ to $3r$, and the serving radio bearer servers $4a$ to $4n$. The IP backbone network $7b$ contains the cell control radio control servers $5a$ to $5s$ and the serving radio control servers $6a$ to $6m$. The router device $9a$ connects the IP backbone network $7a$ to the IP backbone network 7b. The router device 9b connects the IP backbone network 7b to the core network 8 of the mobile communication network.

Figure 2:
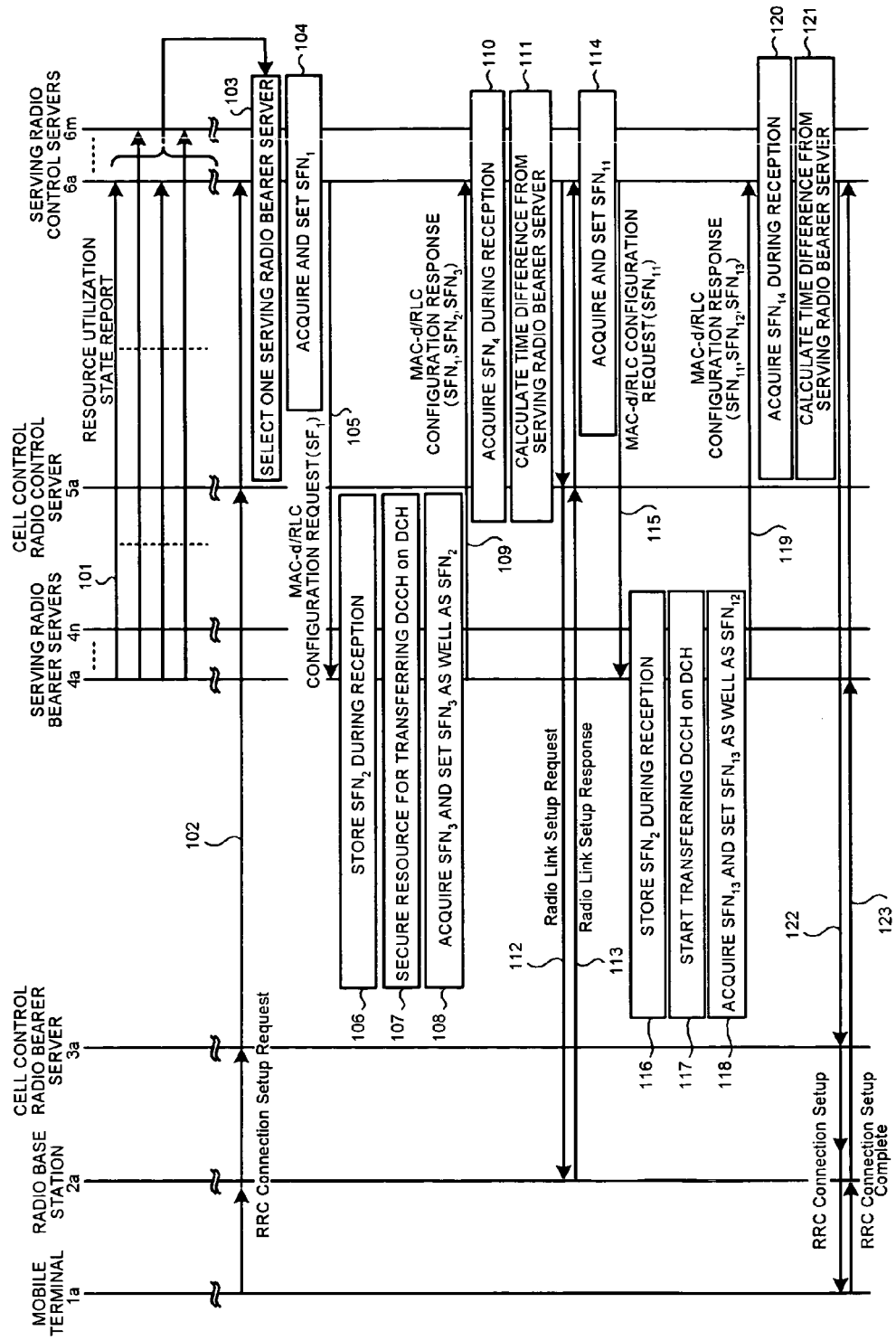
FIG. 2 is a sequence chart for explaining an operation of a radio network system according to first, second, and third embodiments.

FIG. 2 depicts a sequence operation for synchronization among nodes according to the first embodiment. The serving radio bearer servers 4a to 4n constantly transmit resource (channel) utilization state reports (101) to the serving radio control servers 6a to 6m in a predetermined cycle. Following a transmission or reception operation, the mobile terminal 1a transmits an RRC Connection Setup Request (102) (where RRC is short for "Radio Resource Control") to the serving radio control server 6a using a common control channel (CCCH) via the radio base station 2a, the cell control radio bearer server 3a, and the cell control radio control server 5a.

Based on the resource utilization state report (101), the serving radio control server 6a, which receives this RRC Connection Setup Request (102), selects one serving radio bearer server having most vacant resources (channels) from among the serving radio bearer servers 4a to 4n (103). In order to transfer a discrete control channel (DCCH) to the mobile terminal 1a on a discrete transport channel (DCH), the serving radio control server 6a transmits an MAC-d/RLC configuration request (105) to the serving radio bearer server 4a. Just before transmission of this request, the serving radio control server 6a acquires time information (counted cyclically in a range of System Frame Numbers 0 to 327679) SFN1 held by itself, i.e., the serving radio control server 6a. In addition, the serving radio control server 6a adds (superimposes) the acquired SFN1 to (on) the MAC-d/RLC configuration request (105) and transmits it (104).

The serving radio bearer server 4a, which receives the MAC-d/RLC configuration request (105), acquires time information SFN2 held by itself, i.e., the serving radio bearer server 4a at the time of receiving the MAC-d/RLC configuration request, and stores the time information SFN2 as well as the SFN1 (106). The serving radio bearer server 4a secures resources for transferring the discrete control channel (DCCH) on the discrete transport channel (DCH) (107), and then transmits a MAC-d/RLC configuration response to the serving radio control server 6a. Just before transmission of this MAC-d/RLC configuration response (109), the serving radio bearer server 4a acquires time information SFN3 held by itself, i.e., the serving radio bearer server 4a, adds the acquired time information SFN3 as well as the time information SFN2 on the time of reception and the time information SFN1 stored previously to the MAC-d/RLC configuration response (108), and transmits it (109).

The serving radio control server 6a, which receives the MAC-d/RLC configuration response (108), acquires time information SFN4 held by itself at the time of reception (110). In addition, the serving radio control server 6a calculates a time difference from the serving radio bearer server 4a based on the received time information SFN1, SFN2, and SFN3 and the acquired time information SFN4, and executes a node synchronization processing based on the calculated time difference (111). For example, the serving radio control server 6a acquires an average between a time difference (SFN1-SFN2) generated in the MAC-d/RLC configuration request and a time difference (SFN3-SFN4) generated in the MAC-d/RLC configuration response. The serving radio control server 6a executes the node synchronization processing such as adjustment of a present value of a counter that generates time information on the serving radio control server 6a by as much as this average or correction of an output value of the counter by as much as the average.

The serving radio control server 6a, which determines that the resources for transferring the discrete control channel (DCCH) can be secured based on the MAC-d/RLC configuration response (109), transmits a Radio Link Setup Request (112) to the radio base station 2a via the cell control radio control server 5a.

The radio base station 2a, which receives the Radio Link Setup Request (112), sets a radio link for transferring the discrete control channel, and transmits a Radio Link Setup Response (113) to the serving radio control server 6a via the cell control radio control server 5a. The serving radio control server 6a, which determines that the radio link for transferring the discrete control channel can be set based on the Radio Link Setup Response (113), transmits a MAC-d/RLC configuration request (115) to the serving radio bearer server 4a so as to execute transfer of the discrete control channel (DCCH) on the discrete transport channel (DCH). Similarly to the above, just before transmission of this request, the serving radio control server 6a acquires time information SFN11 held by itself, adds the acquired time information SFN11 to the MAC-d/RLC configuration request (115), and transmits it (114).

The serving radio bearer server 4a, which receives the MAC-d/RLC configuration request (115), acquires time information SFN12 held by itself at the time of reception, and stores the acquired time information SFN12 as well as the time information SF11 (116). The serving radio bearer server 4a starts transferring the discrete control channel (DCCH) on the discrete transport channel (DCH) (117), and transmits a MAC-d/RLC configuration response (119) to the serving radio control server 6a. The serving radio bearer server 4a acquires time information SFN13 held by itself and adds the acquired time information SFN13 as well as the time information SFN12 on the time of reception and the time information SFN11 stored previously to the MAC-d/RLC configuration response just before this transmission. The serving radio bearer server 4a then transmits MAC-d/RLC configuration response (119) to the serving radio control server 6a (118).

The serving radio control server 6a, which receives the MAC-d/RLC configuration response (119), acquires time information SFN14 held by itself at the time of reception (120), and re-executes the node synchronization processing based on the received time information SFN11, SFN12, and SFN13 and the acquired time information SFN14 (121).

Thereafter, the serving radio control server 6a transmits an RRC Connection Setup (122) to the mobile terminal 1a via the cell control radio bearer server 3a. The mobile terminal 1a, which receives the RRC Connection Setup (122), establishes a radio link with the radio base station 2a, and transmits an RRC Connection Setup Complete (123) to the serving radio control server 6a.

As explained above, according to the first embodiment, the serving radio control server 6a selects the serving radio bearer server 4a having the most vacant resources (channels) based on the resource utilization state report. When the serving radio control server 6a transmits the control message for indicating transfer of a new call to the selected serving radio bearer server 4a and when the serving radio bearer server 4a transmits the response to the control message, the respective devices, i.e., the serving radio control server 6a and the serving radio bearer server 4a add the time information held by themselves to the control message and the response for transmission. Based on the time information, the synchronization processing, i.e., the node synchronization processing between the serving radio control server and the serving radio bearer server is performed. It is, therefore, possible to efficiently perform the node synchronization processing and reduce traffic of the control messages related to the node synchronization.

Alternatively, the node synchronization processing may be performed using the time information SFN1 and SFN2 to SFN4 stored by the serving radio control server 6a without transmitting the time information SFN1 from the serving radio bearer server 4a to the serving radio control server 6a. In addition, the serving radio bearer server 4a may perform the node synchronization processing based on the time information SFN1 from the serving radio control server 6a and the time information SFN2 acquired by the serving radio bearer server 4a. The node synchronization processing is performed based on the four time information elements SFN1 to SFN4. Alternatively, the node synchronization processing may be performed using the two time information elements SFN1 and SFN2 or SFN3 and SFN4.

Second Embodiment

A second embodiment will be explained with reference to FIG. 3. According to the second embodiment, when a request and a response of a control message for indicating transfer of a new call are transmitted and received between each of the serving radio control servers 6a to 6m and each of the serving radio bearer servers 4a to 4n, time information setting parts are newly defined in an extension header of a packet using IPv6 and time information elements are set to the respective setting parts. Thus, a node synchronization processing is executed.

A radio network system according to the second embodiment is equal in configuration to that shown in FIG. 1 and also equal in sequence operation to that shown in FIG. 2. FIG. 3 depicts a configuration of a header information part of an IPv6 packet used in the second embodiment.

Figure 3:
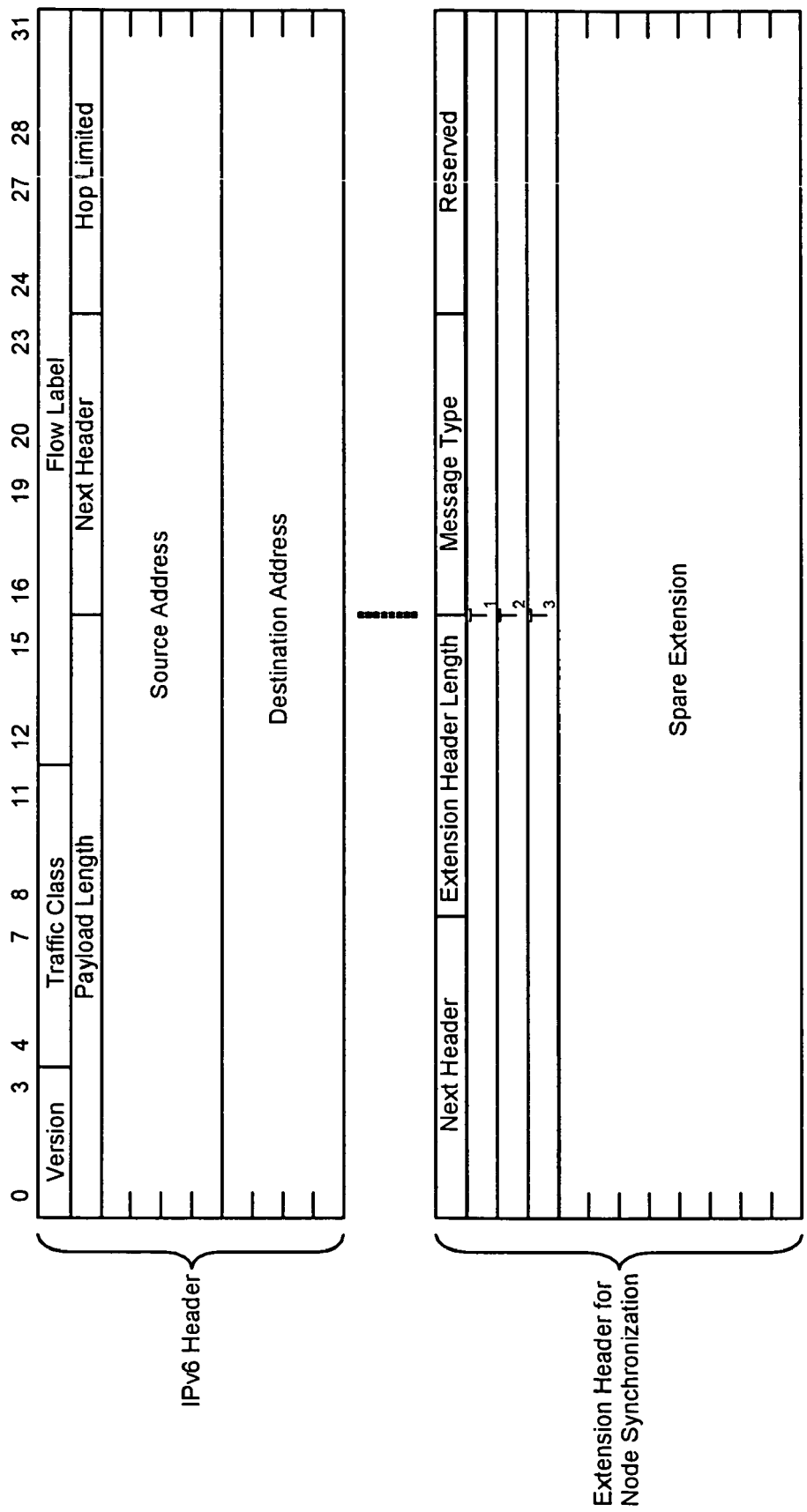
FIG. 3 is a block diagram for explaining a header configuration of an IPv6 packet according to the second embodiment.

With reference to FIG. 3, reference numeral 201 denotes an IPv6 header and 202 denotes an extension header for node synchronization. If the extension header 202 is set following the IPv6 header 201, a number indicating the extension header 202 is set to next header information (Next Header) in the IPv6 header. If the extension header 202 is set following an existing IPv6 extension header such as a route control header or an authentication header, the number indicating the extension header 202 is set to next header information (Next Header) in the existing extension header.

The extension header for node synchronization 202 is configured by next header information (Next Header) 203 indicating the IPv6 extension header following this extension header 202 or a protocol such as TCP or UDP, Extension Header Length 204 for the node synchronization, Message Type 205 indicating whether the control message is a request from the serving radio control server 6a to the serving radio bearer server 4a or a response from the serving radio bearer server 4a to the serving radio control server 6a, Reserved 206, time information T1 (207) on the time when the serving radio control server 6a transmits the control message to the serving radio bearer server 4a, time information T2 (208) on the time when the serving radio bearer server 4a receives the control message from the serving radio control server 6a, time information T3 (209) on the time when the serving radio bearer server 4a transmits a response message after executing a processing according to the control message, and Spare Extension (210).

When transmitting the control message to the serving radio bearer server 4a, the serving radio control server 6a sets the extension header 202 with a value indicating a request set to the Message Type 205, and a value indicating time information at the time of transmission set to the time information T1 (207).

When transmitting the response to the control message to the serving radio control server 6a, the serving radio bearer server 4a sets the extension header 202 with a value indicating the response set to the Message Type 205, a value indicating time information at the time of receiving the control message set to the time information T2 (208), and a value indicating the time information at the time of transmitting the response to the time information T3 (209).

As explained above, according to the second embodiment, when the control messages for controlling reception of the call during generation of the new call are transmitted and received between the serving radio control server 6a and the serving radio bearer server 4a, the time information setting parts are newly defined in the packet extension header using the IPv6 and the time information elements are set to the respective setting parts. Thus, the time information elements are transmitted and received. It is, therefore, possible to use the IPv6 and reduce traffic of the control messages related to the node synchronization processing between these devices.

Third Embodiment

A third embodiment will be explained with reference to FIG. 4. According to the third embodiment, when a request and a response of a control message for indicating transfer of a new call are transmitted and received between the serving radio control servers 6a to 6m and the serving radio bearer servers 4a to 4n, a package descriptor is newly defined using a Megaco/H.248 protocol and time information is set to the defined package descriptor. Thus, the node synchronization processing is executed.

A radio network system according to the third embodiment is equal in configuration to that shown in FIG. 1 and also equal in sequence operation to that shown in FIG. 2. FIG. 4 depicts a configuration of a Megaco/H.248 message according to the third embodiment.

Figure 4:
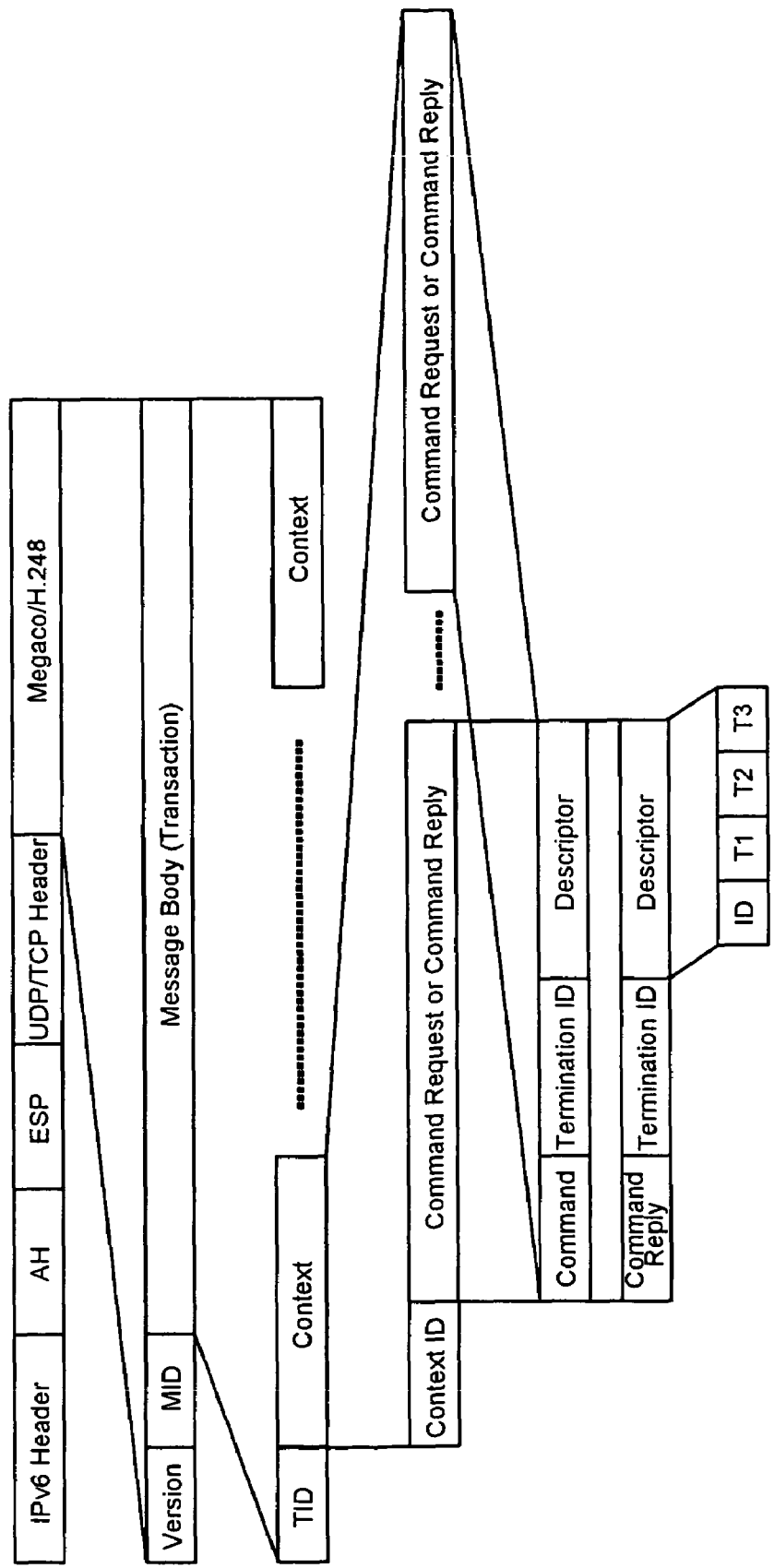
FIG. 4 is a block diagram for explaining a message configuration of a Megaco/H.248 message according to the third embodiment.

With reference to FIG. 4, reference numeral 301 denotes an IPv6 packet according to the Megaco/H.248 protocol transmitted and received between the serving radio control server 6a and the serving radio bearer server 4a. Reference numeral 302 denotes a configuration of a Megaco/H.248 message part. The Megaco/H.248 message part 302 is configured by Version indicating version information on the Megaco/H.248, MID indicating a name and an address of a sender device, and a Message Body (Transaction) indicating a content of a control during a request or a result of the control during a response.

Reference numeral 303 denotes an internal configuration of the Message Body (Transaction). The Message Body 303 is configured by a TID indicating an ID of the transaction and a plurality of Contexts. Reference numeral 304 denotes an internal configuration of each Context. The Context 304 is configured by a Context ID and a plurality of Command Requests or Command Replies. The Command Request 305 is configured by a Command indicating what operation is to be performed in the request, a Termination ID indicating an operation target in the Context, and Descriptor specifying attributes. The Command Reply 306 is configured by Command Reply indicating a requested Command, Termination ID indicating an operation target in the Context designated by the request, and Descriptor indicating attributes designated by the request.

In order to transfer information for the node synchronization, an extension package (Package Descriptor) of the Megaco/H.248 is defined in the Command Request or the Command Reply 304. When transmitting the control message to the serving radio bearer server 4a, the serving radio control server 6a sets an ID (307) indicating that the package is an extension package for the node synchronization to the Package Descriptor and sets time information at a transmission time to time information T1 (308).

On the other hand, when transmitting a response to the control message to the serving radio control server 6a, the serving radio bearer server 4a sets a value indicating time information at the time of control message reception to time information T2 (309) and sets a value indicating time information at the time of response transmission to time information T3 (310) using an extension package similarly to that at the time of the transmission, and then transmits the response.

As explained above, according to the third embodiment, when the control messages for call reception control during occurrence of a new call are transmitted and received between the serving radio control server 6a and the serving radio bearer server 4a, the package descriptor is newly defined using the Megaco/H.248 protocol and the time information is set to the defined package descriptor, thereby transmitting and receiving the time information. It is, therefore, possible to use the Megaco/H.248 protocol and reduce traffic of the control messages related to the node synchronization between these devices.

Fourth Embodiment

Figure 5:
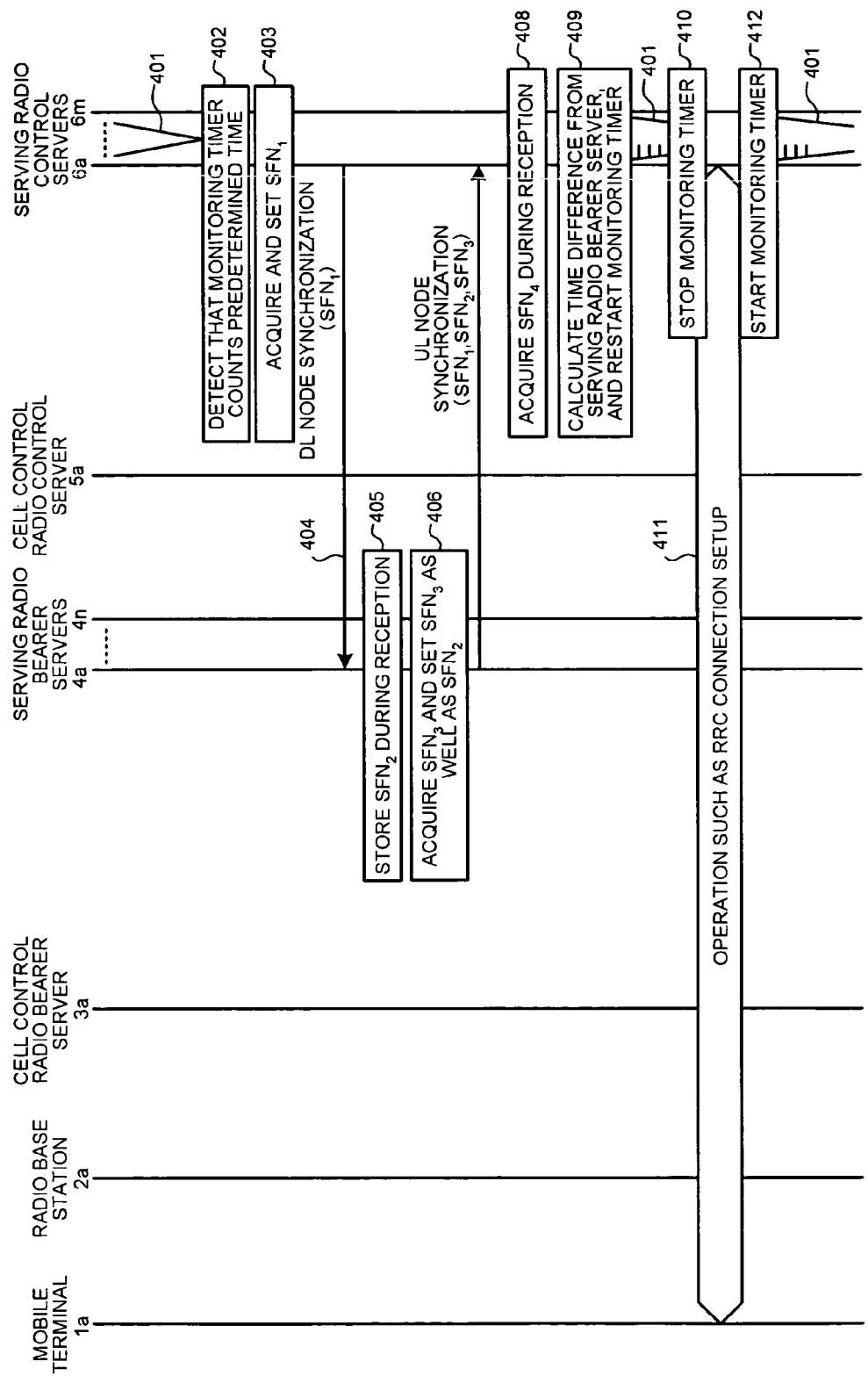
FIG. 5 is a sequence chart for explaining an operation of a radio network system according to a fourth embodiment.

A fourth embodiment will be explained with reference to FIG. 5. According to the fourth embodiment, an independent message for node synchronization is exchanged between the serving radio control servers 6a to 6m and the serving radio bearer servers 4a to 4n only if no control messages are transmitted and received therebetween for a certain time.

A radio network system according to the fourth embodiment is equal in configuration to that shown in FIG. 1. FIG. 5 depicts a sequence operation for the node synchronization according to the fourth embodiment.

The serving radio control server 6a includes a monitoring timer (401) that monitors whether no control messages are transmitted and received between the serving radio control server 6a and the serving radio bearer server 4a for a certain time or more. As shown in FIG. 5, if the monitoring timer (401) detects that no control messages are transmitted and received for a certain time or more, the serving radio control server 6a acquires the time information (counted cyclically in a range of System Frame Numbers 0 to 327679) SFN1 held by itself (403). Immediately after the acquisition, the serving radio control server 6a sets the SFN1 to a DL node synchronizing signal (where DL is short for Downlink) and transmits the DL node synchronizing signal to the serving radio bearer server 4a (404).

The serving radio bearer server 4a, which receives the DL node synchronizing signal (404), acquires and stores the time information SFN2 held by itself during reception (405) and acquires the time information SFN3 held by itself just before transmission of a UL node synchronizing signal (where UL is short for Uplink) (406). The serving radio bearer server 4a sets this time information SFN3 as well as the previously stored time information SFN2 and SFN1 during reception to the UL node synchronizing signal, and transmits the UL node synchronizing signal to the serving radio control server 6a (407).

The serving radio control server 6a, which receives the UL node synchronizing signal, acquires the time information SFN4 held by itself during the reception (408), and executes the node synchronization processing using the received time information SFN1, SFN2, and SFN3 and the acquired SFN4.

Upon finishing the node synchronization processing, the monitoring timer (401) is reset and started (409).

If an operation (411) such as the RRC Connection Setup explained in the first embodiment is activated following a transmission or reception operation of the mobile terminal 1a, the serving radio control server 6a stops the monitoring timer (401) and proceeds to the operation (411). After the operation (411) ends, the serving radio control server 6a restarts (412) the monitoring timer (401).

As explained above, according to the fourth embodiment, only if no control messages are transmitted and received between the serving radio control server 6a and the serving radio bearer server 4a for a certain time, the independent messages (DL node synchronizing signals) for the node synchronization are exchanged between these devices and the time information is set. It is, therefore, possible to further reduce the traffic of the control messages related to the node synchronization therebetween.

In the fourth embodiment, the serving radio control server 6a executes the node synchronization processing based on the time information SFN1 to SFN4. Alternatively, the serving radio bearer server 4a may execute the same node synchronization processing. In this case, the monitoring timer is provided in the serving radio bearer server 4a. If this monitoring timer detects that no control messages are transmitted and received between the serving radio control server 6a and the serving radio bearer server 4a for a certain time or more, the serving radio bearer server 4a transmits the UL node synchronizing signal including the time information SFN1 held by itself to the serving radio control server 6a. Thereafter, similarly to the above, the serving radio control sever 6a transmits the DL node synchronizing signal including the time information SFN1 to SFN3 to the serving radio bearer server 4a. The serving radio bearer server 4a, which receives this DL node synchronizing signal, acquires the time information SFN4 held by itself and executes the node synchronization processing using the time information SFN1, SFN2, and SFN3 included in the DL node synchronizing signal and the acquired SFN4.

Fifth Embodiment

Figure 6:
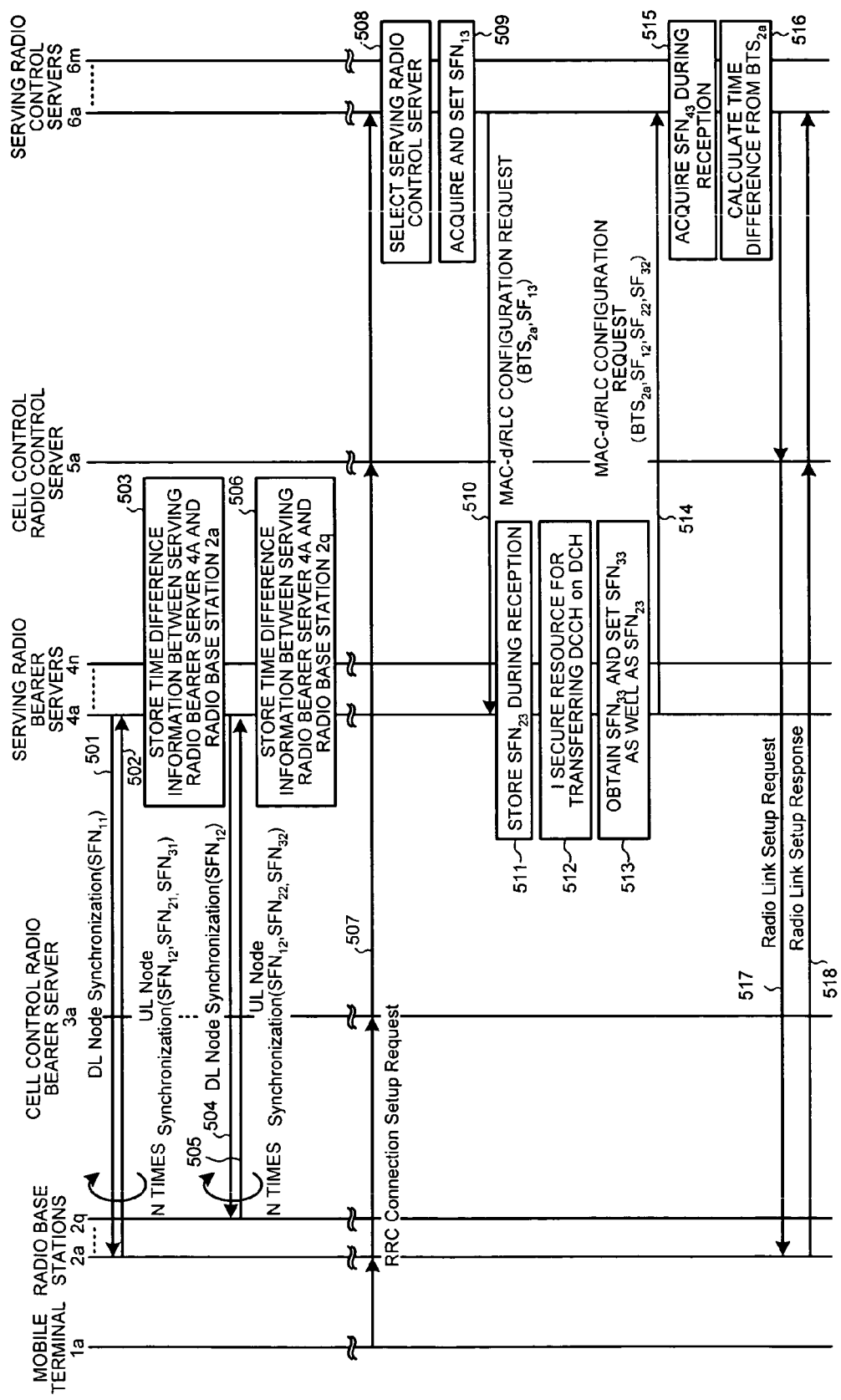
FIG. 6 is a sequence chart for explaining an operation of a radio network system according to a fifth embodiment.

A fifth embodiment will be explained with reference to FIGS. 6 to 8. According to the fifth embodiment, one serving radio bearer server 4a stores and manages time difference information between the serving radio bearer server 4a and each of the radio base stations 2a to 2q acquired by node synchronization procedures with respect to each of the radio base stations 2a to 2q. The serving radio bearer server 4a sets time information on each radio base station based on the stored time difference information on each radio base station during the node synchronization with the serving radio control server, and transmits the time information to the serving radio control server 6a.

A radio network system according to the fifth embodiment is equal in configuration to that shown in FIG. 1. FIG. 6 depicts a sequence operation of the radio network system according to the fifth embodiment. FIG. 7 depicts a configuration o9f a header information part when an IPv6 packet is used in the fifth embodiment. FIG. 8 depicts a configuration of a message when the Megaco/H.248 protocol is used in the fifth embodiment. The node synchronization method of the radio network system according to the fifth embodiment will be explained based on the sequence operation and the configurations.

The serving radio bearer server 4a transmits and receives DL Node Synchronization (501) and UL Node Synchronization (502) to and from the radio base station 2a by a plurality of times (N times) according to node synchronization procedures prescribed in a technical specification of 3GPP (3rd Generation Partnership Project). The serving radio bearer server 4a stores and manages the time difference information between the serving radio bearer server 4a and the radio base station 2a (503).

Likewise, the serving radio bearer server 4a transmits and receives DL Node Synchronization (504) and UL Node Synchronization (505) to and from each of the radio base stations 2b to 2q by a plurality of times (N times, where N is a natural number), and stores and manages time difference information between the serving radio bearer server 4a and each of the radio base stations 2b to 2n.

Namely, the serving radio bearer server 4a periodically executes such node synchronization procedures with each of the radio base stations 2a to 2q connected to the serving radio bearer server 4a, and stores the obtained time difference information to correspond to each of the radio base stations 2a to 2q. Thus, the serving radio bearer server 4a constantly manages the information on the differences between the serving radio bearer server 4a and the radio base stations 2a to 2q.

Following a transmission or reception operation, the mobile terminal 1a transmits an RRC Setup Request (507) to the serving radio control server 6a using a common control channel (CCCH) via the radio base station 2a, the cell control radio bearer server 3a, and the cell control radio control server 5a. The serving radio control server 6a, which receives the RRC Connection Setup Request, performs the same processing (resource utilization state notification) similarly to that explained in the first embodiment in advance, thereby selecting the serving radio bearer server 4a having the most vacant resources (channels) (508). The serving radio control server 6a transmits a MAC-d/RLC configuration request (510) to the selected serving radio bearer server 4a so as to transfer the discrete control channel (DCCH) to the mobile terminal 1a on the discrete transport cannel (DCH). The serving radio control server 6a acquires the time information SFN13 held by itself and adds the time information SFN13 to the MAC-d/RLC configuration request in which the radio base station 2a is designated (509) and then transmits the MAC-d/RLC configuration request (510).

Figure 7:
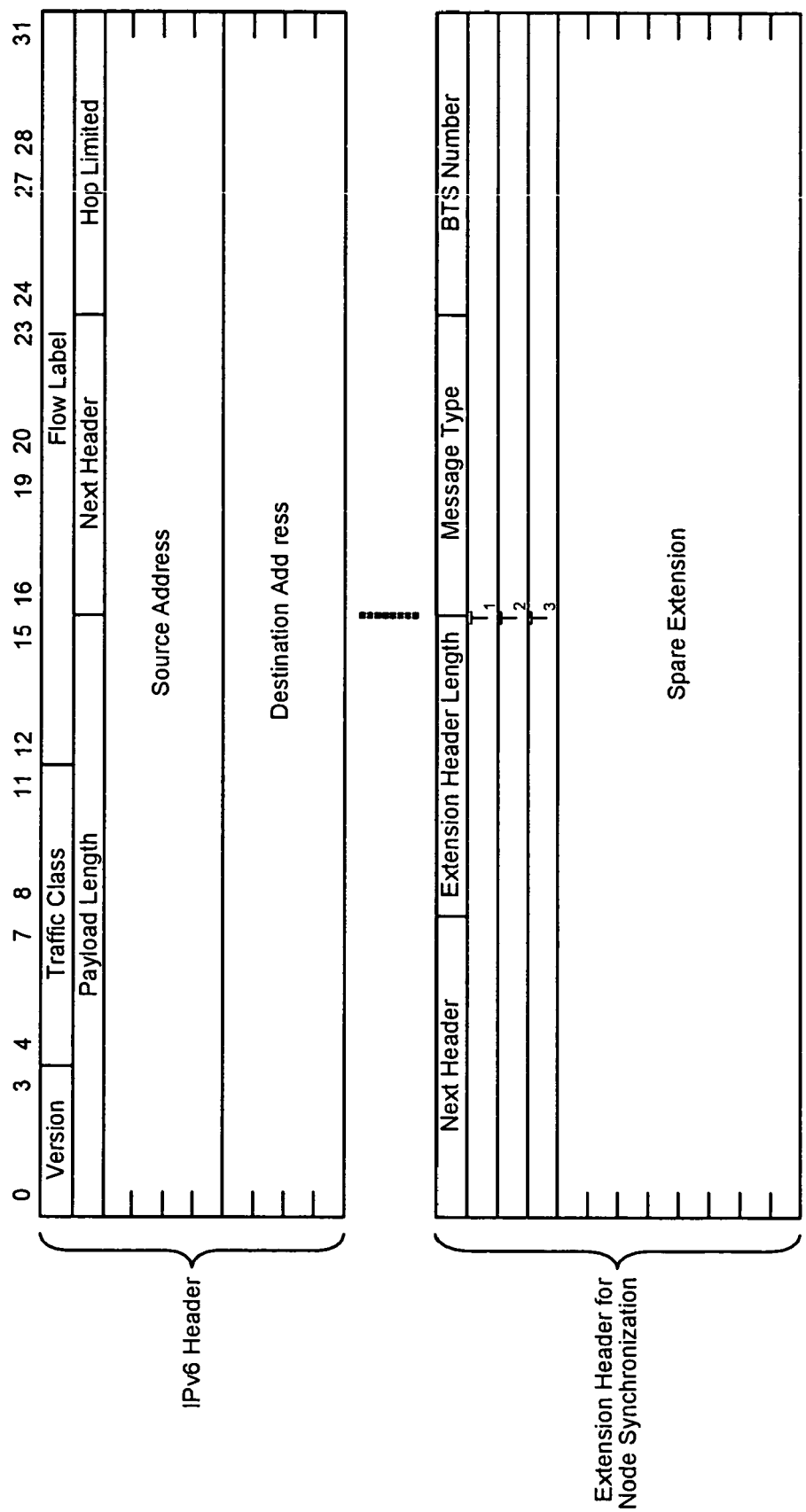
FIG. 7 is a sequence chart for explaining a header configuration of an IPv6 packet according to the fifth embodiment.
Figure 8:
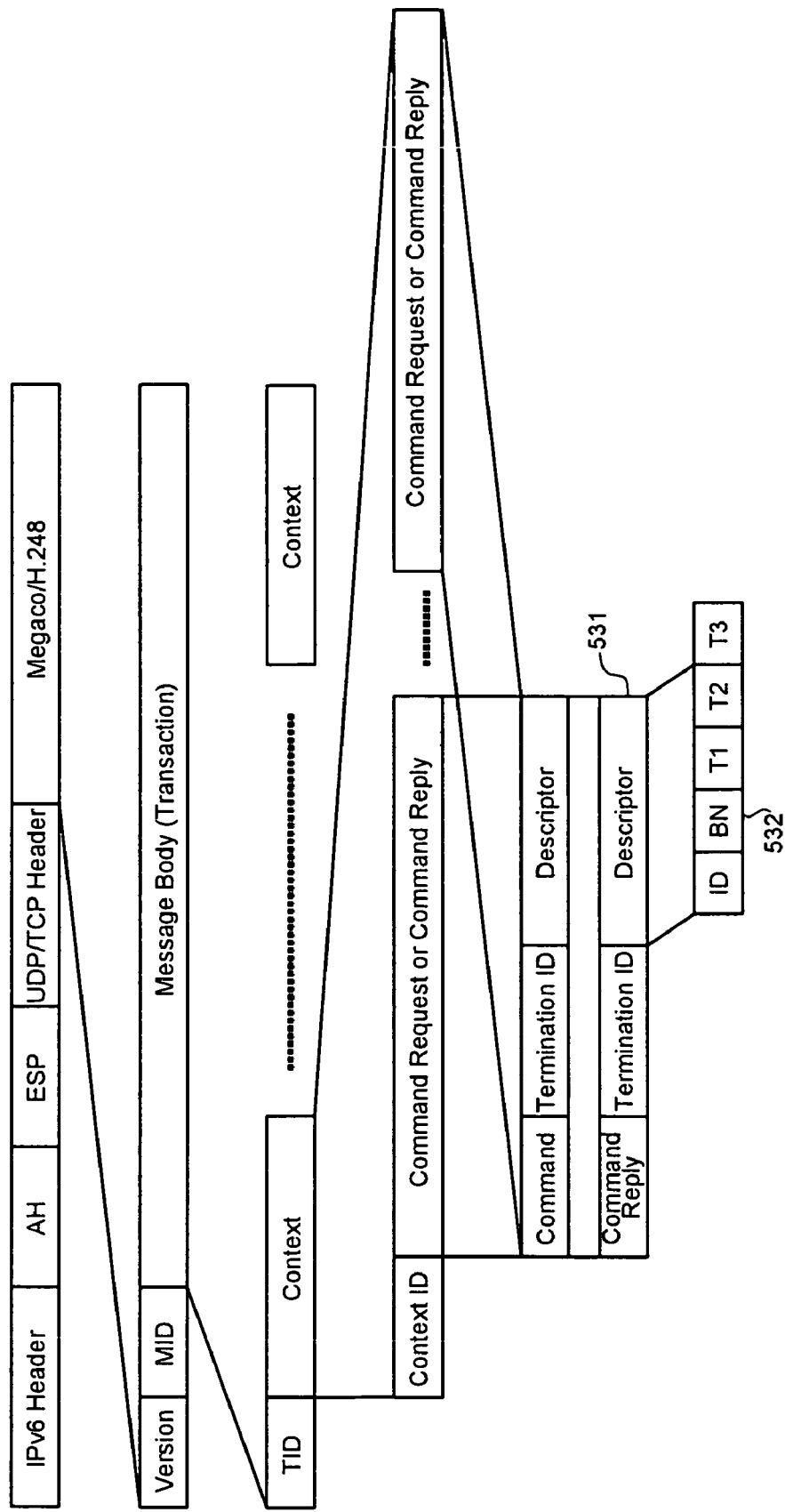
FIG. 8 is a block diagram for explaining a message configuration of a Megaco/H.248 message according to the fifth embodiment.

As a method for designating the radio base station 2a, if the IPv6 packet is used, the number of the radio base station with which the node synchronization is to be established is set in an area of a BTS Number (523) of an extension header for node synchronization 522 following an IPv6 header 521 as shown in FIG. 7. If a Megaco/H.248 message is used, an area (BN) 532 for designating the number of the radio base station is provided in an extension package (Package Descriptor) defined in Command Reply 531 and the number of the radio base station is set in the area (BN) 532 as shown in FIG. 8.

The serving radio bearer server 4a, which receives the MAC-d/RLC configuration request (510), acquires time information held by itself during the reception. The serving radio bearer server 4a acquires difference information (latest difference information at the time of receiving the MAC-d/RLC configuration request) corresponding to the radio base station designated in the MAC-d/RLC configuration request from the difference information on the stored respective radio base stations 2a to 2n. The serving radio bearer server 4a adds or subtracts the difference information on the designated radio base station to or from the time information held by itself. Thus, the serving radio bearer server 4a obtains and stores time information SFN23 on the time of receiving the MAC-d/RLC configuration request (510) in which the radio base station is designated (511).

The serving radio bearer server 4a secures resources for transferring the discrete control channel (DCCH) on the discrete transport channel (DCH) (512). The serving radio bearer server 4a acquires time information held by itself and acquires difference information (latest difference information at the time of transmission) corresponding to the designated radio base station similarly to the above just before transmission of a MAC-d/RLC configuration response. The serving radio bearer server 4a adds or subtracts the difference information corresponding to the designated radio base station to or from the time information held by itself, thereby obtaining time information SFN33 on the time of transmitting the MAC-d/RLC configuration response to the designated radio base station (513). The serving radio bearer server 4a adds this time information SFN33 as well as the previously stored time information SFN23 (and SFN13) on the time of reception to the MAC-d/RLC configuration response and transmits the MAC-d/RLC configuration response to the serving radio control server 6a (514).

The serving radio control server 6a, which receives the MAC-d/RLC configuration response (514), acquires time information SFN43 held by itself during reception (515). The serving radio control server 6a calculates a time difference between the serving radio control server 6a and the designated radio base station 2a based on the received time information SFN13, SFN23, and SFN33 and the acquired time information SFN43. The serving radio control server 6a then executes the node synchronization processing using this calculated time difference (516).

Further, the serving radio control server 6a, which determines that the resources for transferring the discrete control channel (DCCH) can be secured based on the MAC-d/RLC configuration response (514), transmits a Radio Link Setup Request (517) to the radio base station 2a, which transmits the RRC Connection Setup Request (507), via the cell control radio control server 5a.

The radio base station 2a, which receives the Radio Link Setup Request (517), sets a radio link for transferring the discrete control channel, and transmits a Radio Link Setup Response (518) to the serving radio control server 6a via the cell control radio control server 5a.

As explained above, according to the fifth embodiment, the serving radio bearer server stores and manages the time difference information between the serving radio bearer server and each radio base station acquired by the node synchronization procedures for each radio base station. The serving radio bearer server sets the time information on each radio base station based on the time difference information on each radio base station stored during the node synchronization with the serving radio control server. The serving radio bearer server transmits the set time information to the serving radio control server 6a. Further, the serving radio control server 6a executes the node synchronization processing between the serving radio control server 6a and each radio base station based on this reception time information and the like. It is, therefore, unnecessary for the serving radio control server to directly execute the node synchronization procedures between the serving radio control server and each radio base station. Thus, it is possible to further reduce the traffic of the control messages related to the node synchronization between the devices.

Sixth Embodiment

Figure 9:
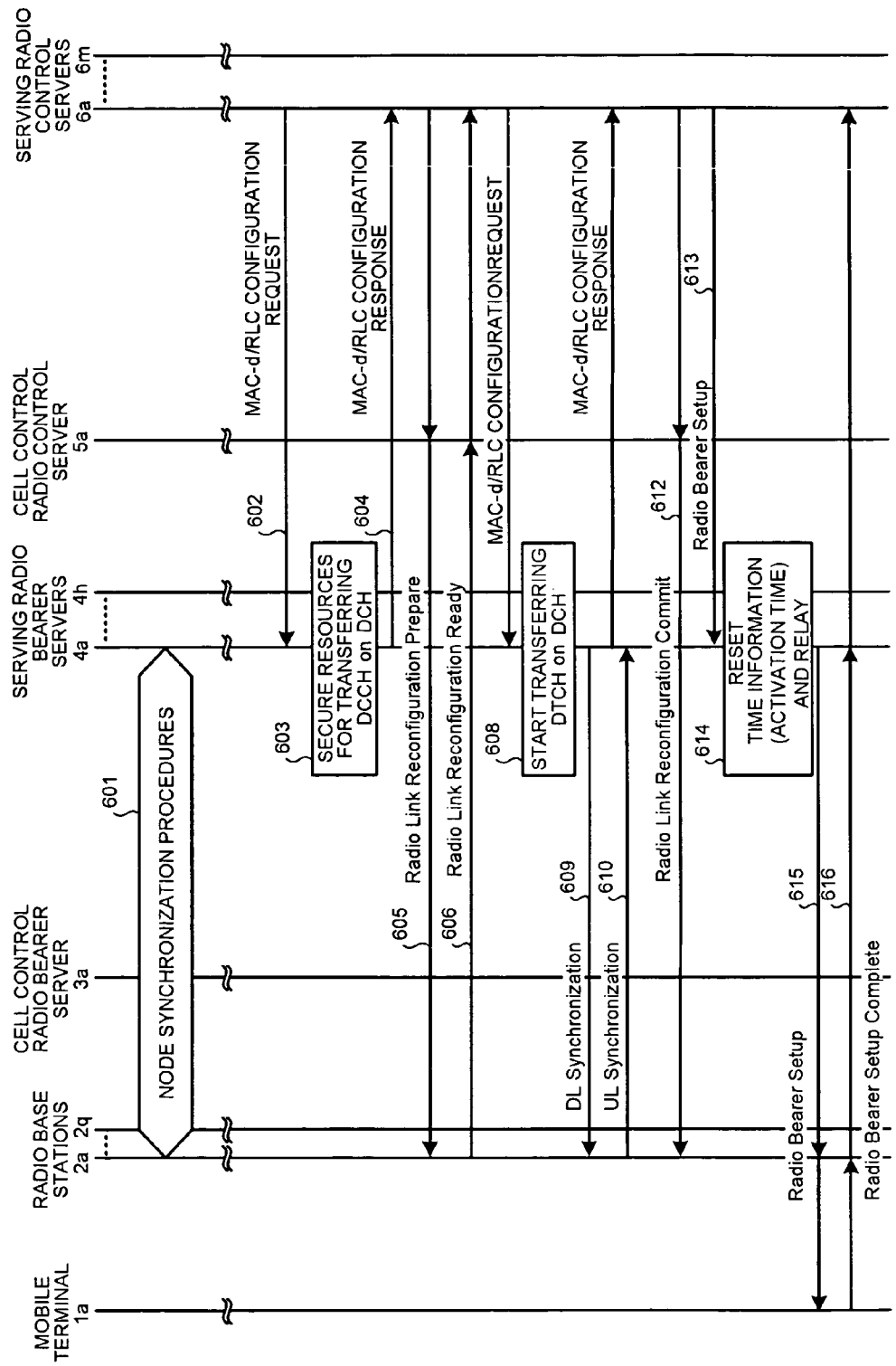
FIG. 9 is a sequence chart for explaining an operation of a radio network system according to a sixth embodiment.

A sixth embodiment will be explained with reference to FIG. 9. According to the sixth embodiment, each of the serving radio bearer servers 4a to 4n resets the time information in a radio resource control message transmitted to the mobile terminal 1*a* from each of the serving radio control servers 6*a* to 6*m* based on the time difference information on each of the radio base stations 2*a* to 2*q* when relaying the message.

A radio network system according to the sixth embodiment is equal in configuration to that shown in FIG. 1. FIG. 9 depicts a sequence operation for node synchronization according to the sixth embodiment. The operation according to the sixth embodiment will be explained with reference to FIG. 9.

As explained in the fifth embodiment, the serving radio bearer server 4*a* periodically executes the node synchronization procedures between the serving radio bearer server 4*a* and each of the radio base stations 2*a* to 2*q*, and constantly stores the obtained time difference information to correspond to each of the radio base stations 2*a* to 2*q* (601). Thereafter, following a transmission or reception operation, the serving radio control server 6*a* transmits a MAC-d/RLC configuration request (602) to the serving radio bearer server 4*a* so as to establish a communication channel for carrying user data, e.g., audio data between radio sections. The serving radio bearer server 4*a*, which receives the MAC-d/RLC configuration request, secures resources for transferring a discrete traffic channel (DTCH) to the mobile terminal 1*a* on the discrete transport channel (DCH) (603). The serving radio bearer server 4*a* transmits a MAC-d/RLC configuration response (604) to the serving radio control server 6*a*.

The serving radio control server 6*a*, which receives the MAC-d/RLC configuration response, determines that the resources can be secured and transmits a Radio Link Reconfiguration Prepare (605) to the radio base station 2*a* via the cell control radio control server 5*a*. The radio base station 2*a*, which receives the Radio Link Reconfiguration Prepare (605), prepares to reconfigure a radio link for superimposing the discrete traffic channel (DTCH) on the radio link and transferring the DTCH-superimposed radio link to the radio link for transmitting and receiving the discrete control channel. The radio base station 2*a* transmits Radio Link Reconfiguration Ready (606) to the serving radio control server 6*a*.

The serving radio control server 6*a*, which receives the Radio Link Reconfiguration Ready (606), determines that preparation for the reconfiguration of the radio link has been made and transmits a MAC-d/RLC configuration request (607) to the serving radio bearer server 4*a* so that the serving radio bearer server 4*a* executes a transfer of the discrete traffic channel (DTCH) on the discrete transport channel (DCH).

The serving radio bearer server 4*a*, which receives the MAC-d/RLC configuration request (607), starts transferring the discrete traffic cannel (DTCH) on the discrete transport channel (DCH) (608). The serving radio bearer server 4*a* transmits DL Synchronization (609) to the radio base station 2*a* so as to match transmission and reception timings of the discrete transport channel (DCH) to each other. The radio base station 2*a*, which receives the DL Synchronization, transmits UL Synchronization (610) to the serving radio bearer server 4*a* with the transmission and reception timings matched to each other. The serving radio bearer server 4*a* transmits MAC-d/RLC configuration response (611) to the serving radio control server 6*a* after transmission of the DL Synchronization (609).

The serving radio control server 6*a*, which receives the MAC-d/RLC configuration response (611), transmits Radio Link Reconfiguration Commit (612) to the radio base station 2*a* via the cell control radio control server 5*a*. The radio base station 2*a*, which receives the Radio Link Reconfiguration Commit (612), superimposes the discrete traffic channel on the radio link transmitting and receiving the discrete control channel according to the time information (CFN: Connection Frame Number) designated by the Radio Link Reconfiguration Commit (612), and starts transferring the discrete traffic channel to the radio link. At the same time, the serving radio control server 6*a* transmits Radio Bearer Setup (613) to the mobile terminal 1*a* via the serving radio bearer server 4*a*.

At this time, the serving radio bearer server 4*a* calculates timing for reconfiguring the radio link between the serving radio bearer server 4*a* and the mobile terminal 1*a* based on time difference information managed by the node synchronization procedures (601) for the node synchronization with the radio base station 2*a*. The serving radio bearer server 4*a* resets (614) the calculation result to an area of time information (Activation Time) that is an information element of the Radio Bearer Setup (613), and transmits the Radio Bearer Setup (615) to the mobile terminal 1*a*.

The mobile terminal 1*a*, which receives the Radio Bearer Setup (615), reconfigures the radio link with the radio base station 2*a* according to the time information (Activation Time) designated by the Radio Bearer Setup (615), and transmits Radio Bearer Setup Complete (616) to the serving radio control server 6*a*.

As explained above, according to the sixth embodiment, each serving radio bearer server resets the time information in the radio resource control message (Radio Bearer Setup) transmitted to one mobile station from each serving radio control server based on the time difference information on the radio base station when relaying the message. It is, therefore, unnecessary to execute the node synchronization processing between the serving radio bearer server and the serving radio control server. Thus, it is possible to further reduce the traffic of the control messages related to the node synchronization between these devices.

Seventh Embodiment

A seventh embodiment will be explained with reference to FIGS. 10 and 11. According to the seventh embodiment, when one of the serving radio bearer servers performs node synchronization procedures with the radio base stations 2*a* to 2*q*, the respective management target radio base-stations 2*a* to 2*q* are handled as one multicast group and assigned an IP multicast address thereto. If a control message including the time information is transmitted to each of the radio base stations 2*a* to 2*q*, the IP multicast address is set as a destination address.

A radio network system according to the seventh embodiment is equal in configuration to that shown in FIG. 1. FIG. 10 depicts a sequence operation for node synchronization according to the seventh embodiment. FIG. 11 depicts a header configuration of a multicast packet according to the seventh embodiment. The operation according to the seventh embodiment will be explained with reference to FIGS. 10 and 11.

Figure 11:
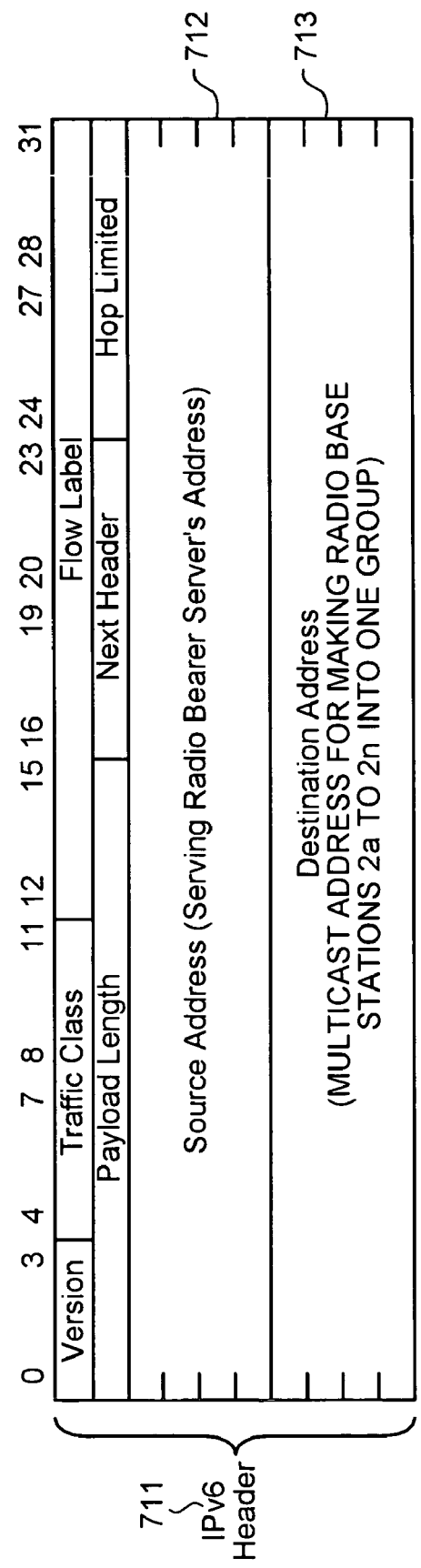
FIG. 11 depicts a header configuration of a multicast packet used in the seventh embodiment.

The serving radio bearer server 4*a* sets a multicast address for making the respective radio base stations 2*a* to 2*q* into one multicast group to a destination address 713 of an IPv6 packet header 711 shown in FIG. 11 when executing node synchronization procedures between the serving radio bearer server 4*a* and each of the radio base stations 2*a* to 2*q*. The serving radio bearer server 4*a* sets an address held by itself to a sender address 712 and transmits DL Node Synchronization (701), to which the time information SFN11 on the time just before transmission held by itself is added, to the respective radio base stations 2*a* to 2*q*. Each of the radio base stations 2*a* to 2*q*, which receives the DL Node Synchronization, acquires and stores time information (radio base station 2*a*: SFN21, radio base station 2b: SFN22, ... ) on the time of receiving the DL Node Synchronization. Each of the radio base stations 2a to 2q sets the time information on the time of receiving the DL Node Synchronization, time information (radio base station 2a: SFN31, radio base station 2b: SFN32, ... ) on the time just before transmission of UL Node Synchronization, and the time information SFN11 to each UL Node Synchronization. Each of the radio base stations 2a to 2q transmits respective UL Node Synchronization (radio base station 2a: 702, radio base station2b: 704, ... ) to the servin bearer server 4a.

Figure 10:
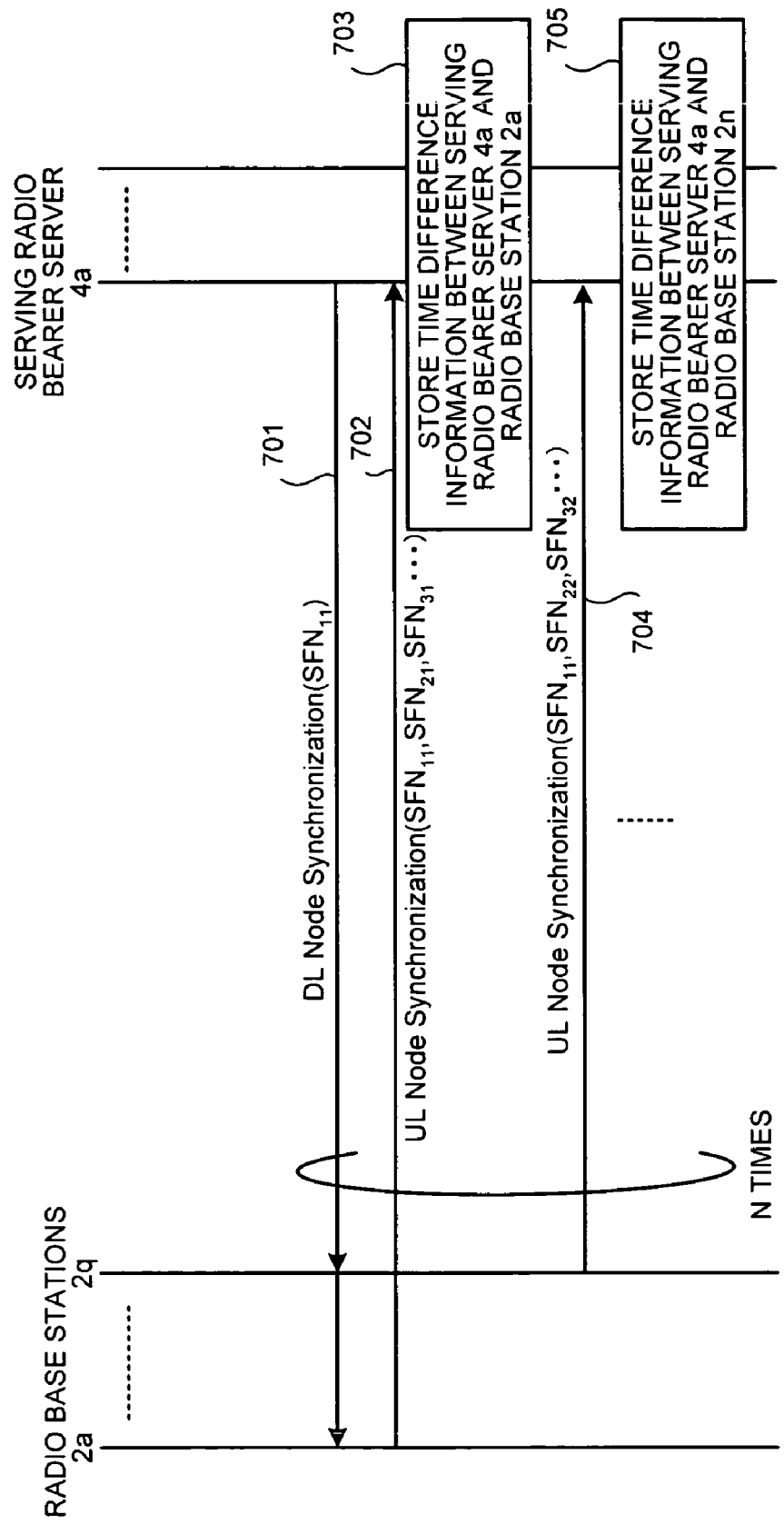
FIG. 10 is a sequence chart for explaining an operation of a radio network system according to a seventh embodiment.

The serving radio bearer server 4a, which receives each UL Node Synchronization from each radio base station 2a, acquires time information on the time of receiving the UL Node Synchronization of itself at the timing of receiving each UL Node Synchronization (note that in FIG. 10, the UL Node Synchronization from the radio base station 2a is transmitted prior to the UL Node Synchronization from the radio base station 2b; however, since the radio base stations operate asynchronously, transmission order is at random). The serving radio bearer server 4a calculates and stores time difference information between the serving radio bearer server 4a and each of the radio base stations 2a to 2q based on the received time information and the acquired time information on the time of receiving the UL Node Synchronization of itself (703 and 705). The stored difference information on the respective radio base stations 2a to 2q is used in the processing explained in the fifth or the sixth embodiment.

As explained above, according to the seventh embodiment, when one of the serving radio bearer servers 4a to 4n performs the node synchronization procedures with the radio base stations 2a to 2q, the respective management target radio base stations are handled as one multicast group. If the control message including the time information is transmitted to each radio base station, the IP multicast address is set as the destination address. Therefore, as compared with an instance in which one of the serving radio bearer servers 4a to 4n unicast-transmits messages for the node synchronization to the respective radio base stations 2a to 2q, the traffic of the control messages related to the node synchronization between the devices can be reduced.

Eighth Embodiment

Figure 12:
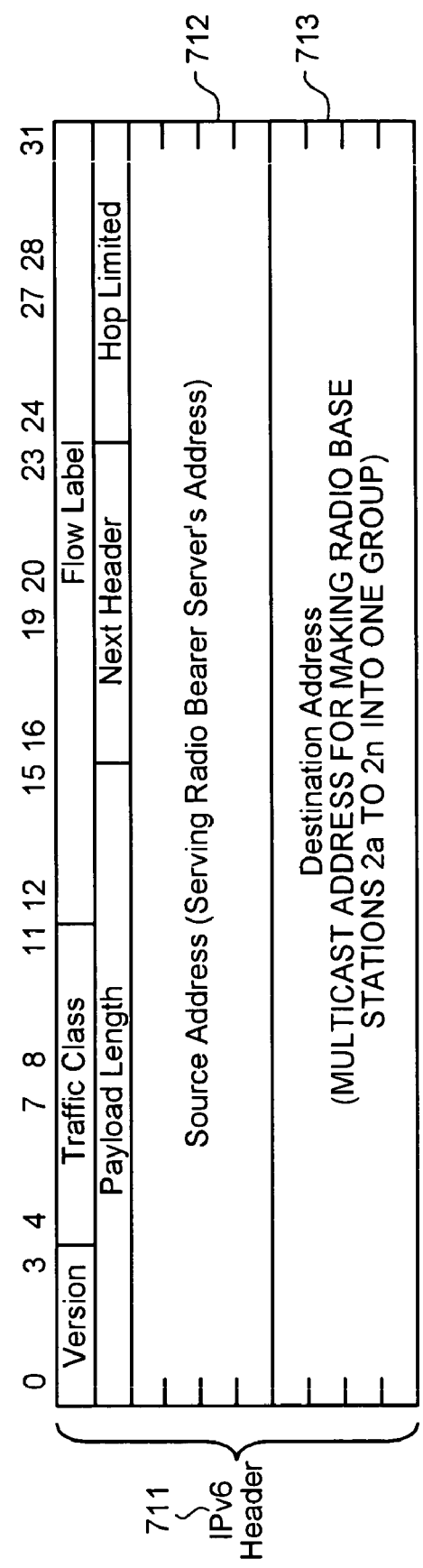
FIG. 12 is a sequence chart for explaining an operation of a radio network system according to an eighth embodiment.
Figure 13:
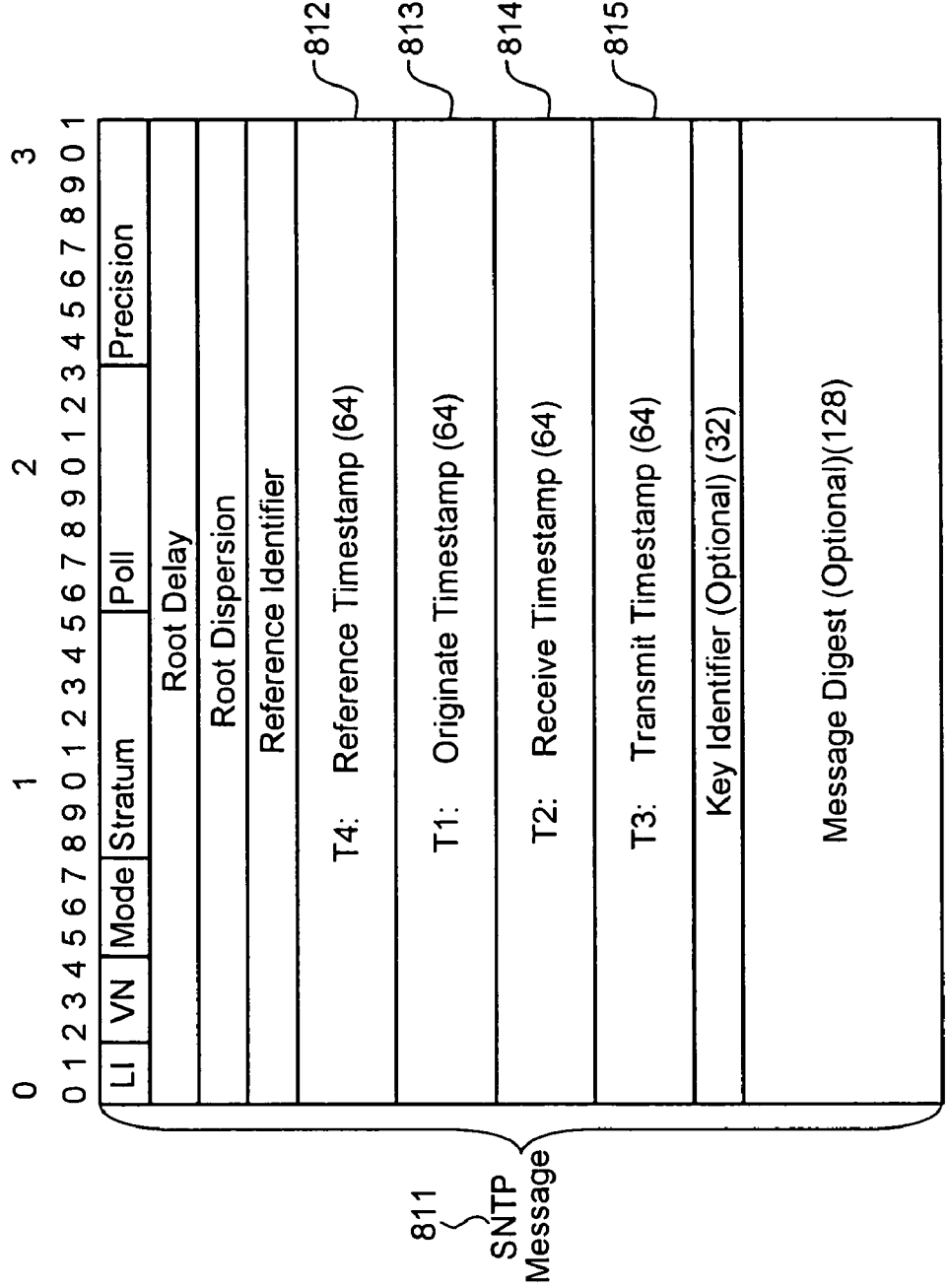
FIG. 13 is a block diagram for explaining a message configuration of an SNTP message used in the eighth embodiment.

An eighth embodiment will be explained with reference to FIGS. 12 and 13. According to the eighth embodiment, during transmission and reception of independent messages for node synchronization between each of the serving radio bearer servers 4a to 4n and each of the serving radio control servers 6a to 6m, the serving radio bearer servers 4a to 4n employ SNTP (Simple Network Time Protocol) so that the serving radio bearer servers 4a to 4n operate as an NTP server and so that the serving radio control servers 6a to 4m operate as an NTP client.

A radio network system according to the eighth embodiment is equal in configuration to that shown in FIG. 1. FIG. 12 depicts a sequence operation for a node synchronization method according to the eighth embodiment. FIG. 13 depicts a configuration of an SNTP message. The operation according to the eighth embodiment will be explained with reference to FIGS. 12 and 13.

The serving radio bearer server 4a activates a process for an NTP server when started (801). After starting the serving radio bearer server 4a, the serving radio control server 6a acquires the time information (cyclically counted in a range of System Frame Numbers 0 to 327679) SF11 held by itself just before transmission as the NTP client, sets the time information SFN11 to Originate Timestamp 813 in Time Request (802) (see FIG. 13), and transmits the Time Request (802) to the serving radio bearer server 4a so as to establish node synchronization with the serving radio bearer server 4a.

The serving radio bearer server 4a, which receives the Time Request (802), acquires and stores the time information SFN22 held by itself at the time of reception and further acquired the time information SFN 32 held by itself just before transmission of Time Reply (803), sets the time information SFN3 to Receive Timestamp 814 in the Time Reply (803) (see FIG. 13) and the time information SFN2 to Transmit Timestamp 815 (see FIG. 13), and transmits the Time Reply (803) to the serving radio control server 6a.

The serving radio control server 6a, which receives the Time Reply (803), acquires the time information SFN4 (Reference Timestamp 812 (see FIG. 13)) held by itself on the time of reception. The serving radio control server 6a executes the node synchronization processing between the serving radio control server 6a and the serving radio bearer server 4a based on the received time information SFN1, SFN2, and SFN3 and the acquired time information SFN4 (804).

As explained above, according to the eighth embodiment, the serving radio bearer server employs the SNTP during transmission and reception of the independent messages for the node synchronization between the serving radio bearer server and the serving radio control server. Thus, the serving radio bearer server operates as the NTP server and the serving radio control server operates as the NTP client. It is, therefore, possible to employ a general-purpose protocol, thereby simplifying the node synchronization therebetween.

Ninth Embodiment

Figure 14:
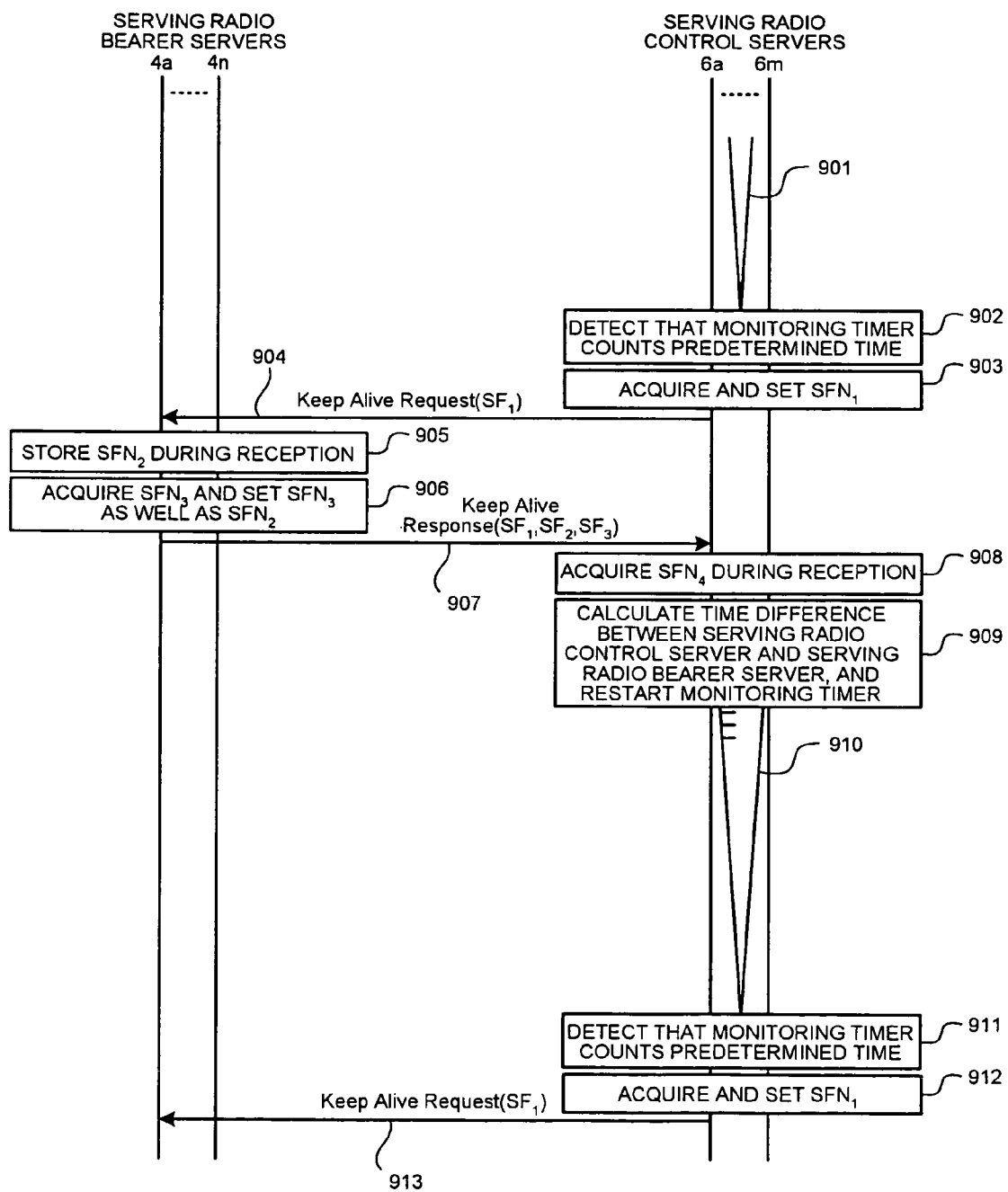
FIG. 14 is a sequence chart for explaining an operation of a radio network system according to a ninth embodiment.
Figure 15:
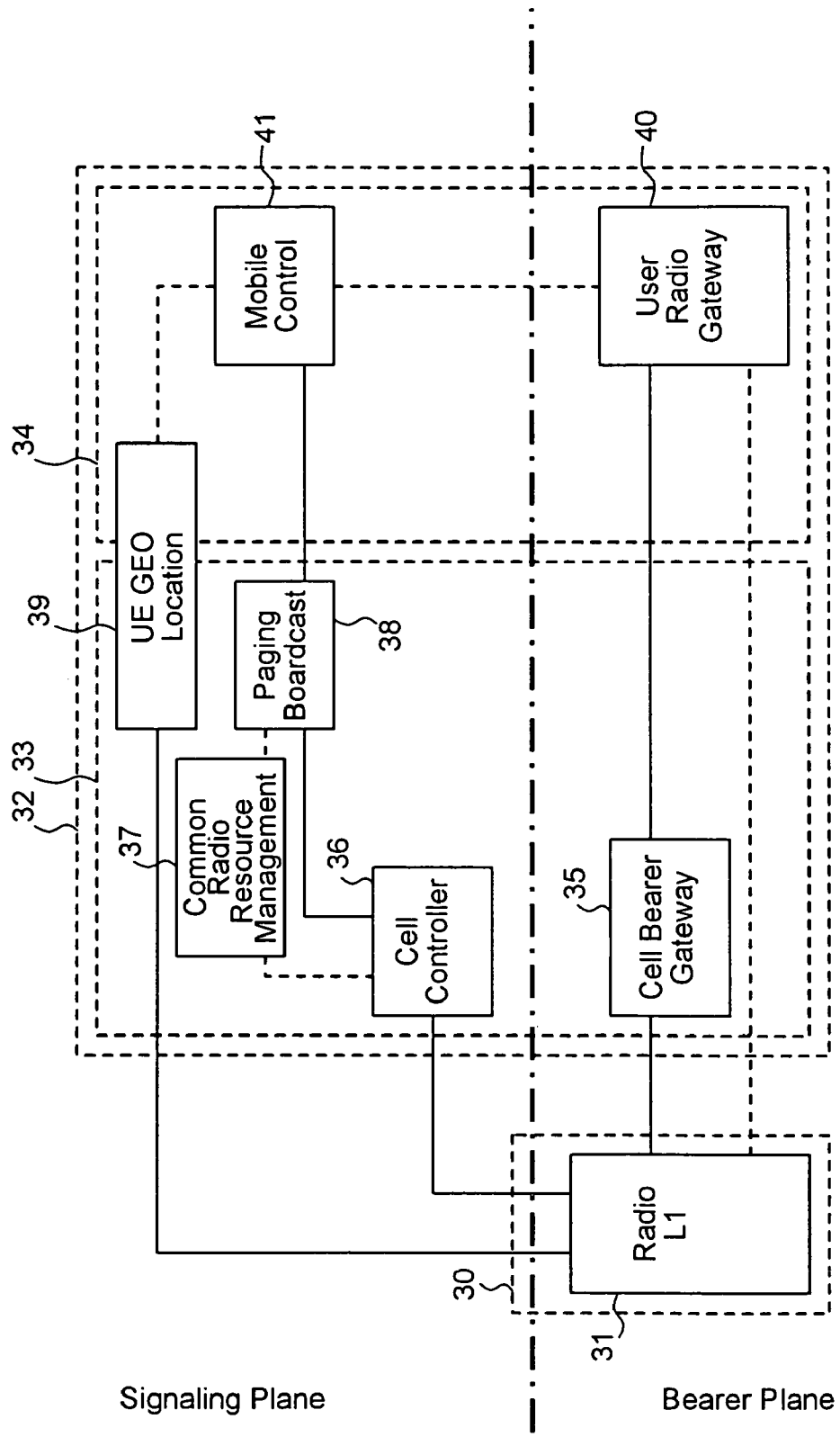
FIG. 15 depicts a conventional technique.

A ninth embodiment will be explained with reference to FIG. 14. According to the ninth embodiment, time information held by each device is set in control messages exchanged between the serving radio control server and the serving radio bearer server for Keep Alive control (confirmation as to whether a system is not down), thereby executing a node synchronization processing therebetween.

A radio network system according to the ninth embodiment is equal in configuration to that shown in FIG. 1. FIG. 14 depicts a sequence operation for node synchronization according to the ninth embodiment. The operation according to the ninth embodiment will be explained with reference to FIG. 14.

After the serving radio bearer server 4a is activated, the serving radio control server 6a activates a monitoring timer (901) so as to confirm whether the system is not down. When it is detected that the monitoring timer counts preset predetermined time (902), the serving radio control server 6a transmits a Keep Alive Request (904) to the serving radio bearer server 4a. Just before this transmission, the serving radio control server 6a acquires the time information (counted cyclically in a range of System Frame Numbers 0 to 327679) SFN1 held by itself (903), adds the SFN1 to the Keep Alive Request (904), and transmits the Keep Alive Request to the serving radio bearer server 4a.

The serving radio bearer server 4a, which receives the Keep Alive Request, acquires and stores the time information SFN2 held by itself on the time of reception (905), and acquires the time information SFN3 held by itself just before transmission of a Keep Alive Response (907). The serving radio bearer server 4a adds this time information SFN3 as well as the previously stored time information SFN2 on the time of reception to the Keep Alive Response (907) and transmits the Keep Alive Response to the serving radio control server 6a (906).

The serving radio control server 6a, which receives the Keep Alive Response (906), acquires the time information SFN4 held by itself during the reception (908), calculates a time difference between the serving radio control server 6a and the serving radio bearer server 4a based on the received time information SFN1, SFN2, and SFN3 and the acquired time information SFN4, and executes the node synchronization.

The serving radio control server 6a restarts (909) the monitoring start timer (910). Thereafter, the serving radio control server 6a sequentially detects that the monitoring timer counts the predetermined time (911), acquires and sets the time information SFN1 held by itself (912), and transmits the Keep Alive Request (913).

As explained above, according to the ninth embodiment, the time information held by the serving radio control server and the serving radio bearer server is set in the control messages exchanged therebetween for Keep Alive control, thereby executing the node synchronization processing therebetween. It is, therefore, not necessary to newly define independent messages for the node synchronization and the traffic of the control messages related to the node synchronization therebetween can be reduced.

In the respective embodiments, the node synchronization processing is executed among the serving radio control servers 6a to 6m, the serving radio bearer servers 4a to 4n, and the radio base stations 2a to 2q. Alternatively, the node synchronization processing explained in the embodiments can be executed among the other devices, e.g., between the cell control radio control servers 5a to 5s and the cell control radio bearer servers 3a to 3r.

INDUSTRIAL APPLICABILITY

As explained above, the node synchronization method for the radio network system, the radio control server, and the radio bearer server according to the present invention are useful for a radio network system that includes a plurality of radio base stations that communicate with a plurality of mobile terminals, a plurality of radio control servers that manage the radio base stations and control a radio line in a control plane, and a plurality of radio bearer servers that control a data transfer between the mobile terminals and a user plane.

The invention claimed is:

1. A node synchronization method employed on a radio network system that includes a plurality of radio base stations that communicate with a plurality of mobile terminals; a plurality of radio control servers that manage the radio base stations and control a radio line in a control plane; and a plurality of radio bearer servers that control a data transfer between each of the mobile terminals and a user plane, comprising:
exchanging a control message for indicating transfer of a new call between each of the radio control servers and each of the radio bearer servers when the new call is generated,
setting time information held by the each radio control server and time information held by the each radio bearer server in the control message, and
executing a node synchronization processing for node synchronization between the each radio control server and the each radio bearer server based on a difference between the time information elements.

2. The node synchronization method for a radio network system according to claim 1, wherein
an IPv6 is used as the control message, setting parts of setting the time information elements are newly defined in an extension header of a packet, and the time information elements are set to the setting parts.

3. The node synchronization method for a radio network system according to claim 1, wherein
a Megaco/H.248 protocol is used as the control message, and the time information is set in a newly defined package.

4. The node synchronization method for a radio network system according to claim 1, wherein
only if the control message is not transmitted or received for a certain time or more between the each radio control server and the each radio bearer server, an independent control message for the node synchronization is exchanged between the each radio control server and the each radio bearer server.

5. The node synchronization method for a radio network system according to claim 1, wherein
the each radio bearer server acquires a difference in the time information between the each radio base station and the each radio bearer server by the node synchronization processing for the node synchronization with the each radio base station, and
if setting time information held by the each radio bearer server when the control message for indicating the transfer of the new call is exchanged between the each radio control server and the each radio bearer server, the each radio bearer server sets time information on the each radio base station based on the acquired difference in the time information between the each radio base station and the each radio bearer server, so that the each radio bearer server executes the node synchronization processing for the node synchronization between the each radio control server and the each radio base station.

6. The node synchronization method for a radio network system according to claim 1, wherein
the each radio bearer server acquires a difference in the time information between the each radio base station and the each radio bearer server by the node synchronization processing for the node synchronization with the each radio base station, and
when relaying a radio resource control message transmitted from the each radio control server to the mobile terminal, the radio bearer server changes a setting of time information in the radio resource control message based on the acquired difference in the time information between the each radio base station and the each radio bearer server.

7. The node synchronization method for a radio network system according to claim 5, wherein
when executing procedures for the node synchronization with the each radio base station, the radio bearer server handles the respective base stations to be managed as one multicast group, and when transmitting the control message including the time information to the each radio base station in the multicast group, the radio bearer server sets an IP multicast address as a destination address.

8. The node synchronization method for a radio network system according to claim 1, wherein
when an independent message for executing procedures for the node synchronization with the each radio control server is exchanged between the each radio bearer server and the each radio control server, the each radio bearer server employs SNTP, the each radio bearer server operates as an NTP server, and the each radio control server operates as an NTP client.

9. The node synchronization method for a radio network system according to claim 1, wherein
time information held by the each radio control server and time information held by the each radio bearer server are set in the control message exchanged between the each radio control server and the each radio bearer server for Keep Alive control, thereby executing the node synchronization processing for the node synchronization between the each radio control server and the each radio hearer server.

10. A radio control server that exchanges a control message with a radio bearer server, manages a plurality of radio base stations, and controls a radio line of a control plane, the radio bearer server controlling a data transfer between a mobile terminal and a user plane, the radio control server comprising:
a node synchronization processor that executes a node synchronization processing for node synchronization between the radio control server and the radio bearer server based on a difference between time information held by the radio control server when exchanging the control message with the radio bearer server and time information included in the control message from the radio bearer server.

11. The radio control server according to claim 10, wherein a difference in time information between each of the radio base stations and the radio bearer server, acquired by the radio bearer server by the node synchronization processing for the node synchronization with the each radio base station, is added to the time information included in the control message from the radio bearer server.

12. The radio control server according to claim 10, wherein the control message is used for indicating transfer of a new call or for Keep Alive control.

13. A radio bearer server that transmits, to a radio control server, a response message to a control message from the radio control server and controls a data transfer between a mobile terminal and a user plane, the radio control server managing a plurality of radio base stations and controlling a radio line of a control plane, wherein
in transmitting the response message to the control message including first time information transmitted from the radio control server, the radio bearer server adds second time information indicating a time of receiving the control message, third time information indicating a time of transmitting the response message, and the first time information to the response message, and transmits the response message to the radio control server, thereby enabling the radio control server to execute a node synchronization processing,
wherein a difference in time information between each of the radio base stations and the radio bearer server, acquired by the radio bearer server by the node synchronization processing for node synchronization with each radio base station, is added to the second time information and the third time information.

14. The radio bearer server according to claim 13, wherein the control message is used for indicating transfer of a new call or for a Keep Alive control.

15. The radio bearer server according to claim 13, wherein when relaying a radio resource control message transmitted from the radio control server to the mobile terminal, a setting of time information in the radio resource control message is changed based on difference information on the time information between the each radio base station and the radio bearer server, acquired by the radio bearer server by the node synchronization processing for node synchronization with the each radio base station.

16. A radio bearer server that exchanges a control message with a radio control server and controls a data transfer between a mobile terminal and a user plane, the radio control server managing a plurality of radio base stations and controlling a radio line of a control plane, and the radio bearer server comprising:
a node synchronization processor that executes a node synchronization processing for node synchronization between the radio bearer server and the radio control server based on a difference between time information, which is held by the radio bearer server and which is acquired when the control message is exchanged between the radio bearer server and the radio control server, and time information, which is included in the control message from the radio control server.

17. A radio control server that exchanges a first control message for indicating transfer of a new call with a radio bearer server, manages a plurality of base stations, and controls a radio line of a control plane, the radio bearer server controlling a data transfer between a mobile terminal and a user plane, and the radio control server comprising:
a monitoring timer that monitors whether the radio control server does not transmit or receive the first control message to or from the radio bearer server for a certain time or more; and
a node synchronization processor that, if the monitoring timer detects that the first control message is not transmitted or received for a certain time or more, exchanges a predetermined second control message for node synchronization with the radio bearer server, and that executes a node synchronization processing for the node synchronization with the radio bearer server based on a difference between time information, which is held by the radio control server and which is acquired by the radio control server when the second control message is exchanged, and time information, which is included in the second control message from the radio bearer server.

18. A radio bearer server that exchanges a first control message for indicating transfer of a new call with a radio control server, and controls a data transfer between a mobile terminal and a user plane, the radio control server managing a plurality of base stations and controlling a radio line of a control plane, and the radio bearer server comprising:
a monitoring timer that monitors whether the radio bearer server does not transmit or receive the first control message to or from the radio control server for a certain time or more; and
a node synchronization processor that, if the monitoring timer detects that the first control message is not transmitted or received for a certain time or more, exchanges a predetermined second control message for node synchronization with the radio control server, and that executes a node synchronization processing for the node synchronization with the radio control server based on a difference between time information, which is held by the radio bearer server and which is acquired by the radio bearer server when the second control message is exchanged, and time information, which is included in the second control message from the radio control server.

* * * * *